(12) United States Patent
Lee et al.

(10) Patent No.: US 11,991,723 B2
(45) Date of Patent: May 21, 2024

(54) METHOD AND APPARATUS FOR PERFORMING BWP-BASED SIDELINK COMMUNICATION IN NR V2X

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 402 days.

(21) Appl. No.: 17/297,340

(22) PCT Filed: Jan. 13, 2020

(86) PCT No.: PCT/KR2020/000591
§ 371 (c)(1),
(2) Date: May 26, 2021

(87) PCT Pub. No.: WO2020/145781
PCT Pub. Date: Jul. 16, 2020

(65) Prior Publication Data
US 2021/0400663 A1 Dec. 23, 2021

Related U.S. Application Data

(60) Provisional application No. 62/791,727, filed on Jan. 11, 2019.

(51) Int. Cl.
*H04W 4/40* (2018.01)
*H04W 4/50* (2018.01)
(Continued)

(52) U.S. Cl.
CPC ............. *H04W 72/40* (2023.01); *H04W 4/40* (2018.02); *H04W 4/50* (2018.02);
(Continued)

(58) Field of Classification Search
CPC ..... H04L 67/12–125; H04L 69/24–26; H04W 4/30–80; H04W 8/22–245;
(Continued)

(56) References Cited

U.S. PATENT DOCUMENTS

2017/0347394 A1 11/2017 Yasukawa et al.
2021/0258958 A1* 8/2021 Li .................. H04W 72/40
(Continued)

FOREIGN PATENT DOCUMENTS

WO WO-2019160788 A1 * 8/2019 ............ H04W 72/40

OTHER PUBLICATIONS

Huawei et al., "Sidelink PHY structure and procedure for NR V2X," R1-1810138, 3GPP TSG RAN WG1 Meeting #94bis, Oct. 2018, 17 pages (Year: 2018).*
(Continued)

*Primary Examiner* — Timothy J Weidner
(74) *Attorney, Agent, or Firm* — LEE, HONG, DEGERMAN, KANG & WAIMEY

(57) ABSTRACT

Provided are a method for performing wireless communication by a first device and an apparatus supporting same. The method may comprise the steps of: transmitting, to a second device, information related to a first resource on a sidelink (SL) bandwidth part (BWP); and performing SL reception from the second device on a second resource on the SL BWP. The second resource may not overlap with the first resource.

13 Claims, 24 Drawing Sheets

(51) Int. Cl.

| | |
|---|---|
| *H04W 28/08* | (2023.01) |
| *H04W 72/0446* | (2023.01) |
| *H04W 72/0453* | (2023.01) |
| *H04W 72/25* | (2023.01) |
| *H04W 72/40* | (2023.01) |
| *H04W 76/14* | (2018.01) |
| *H04W 76/23* | (2018.01) |
| *H04W 84/00* | (2009.01) |
| *H04W 84/02* | (2009.01) |
| *H04W 88/06* | (2009.01) |
| *H04W 88/08* | (2009.01) |
| *H04W 92/02* | (2009.01) |
| *H04W 92/10* | (2009.01) |
| *H04W 92/18* | (2009.01) |

(52) U.S. Cl.
CPC ....... *H04W 28/0875* (2020.05); *H04W 28/09* (2020.05); *H04W 72/0446* (2013.01); *H04W 72/0453* (2013.01); *H04W 72/25* (2023.01); *H04W 76/14* (2018.02); *H04W 76/23* (2018.02); *H04W 84/005* (2013.01); *H04W 84/02* (2013.01); *H04W 88/06* (2013.01); *H04W 88/08* (2013.01); *H04W 92/02* (2013.01); *H04W 92/10* (2013.01); *H04W 92/18* (2013.01)

(58) Field of Classification Search
CPC ..... H04W 24/02–10; H04W 28/02–26; H04W 40/24–32; H04W 48/02–20; H04W 56/0005–0025; H04W 72/02–569; H04W 74/002–0891; H04W 76/10–50; H04W 84/005–22; H04W 88/02–12; H04W 92/02–04; H04W 92/10–12; H04W 92/16–18

See application file for complete search history.

(56) References Cited

U.S. PATENT DOCUMENTS

2021/0307032 A1* 9/2021 Osawa ................. H04W 72/40
2021/0352623 A1* 11/2021 Wang .................... H04W 72/40

OTHER PUBLICATIONS

PCT International Application No. PCT/KR2020/000591, International Search Report dated Apr. 27, 2020, 4 pages.

LG Electronics, "Study on NR V2X," RP-182490, 3GPP TSG RAN meeting #82, Dec. 2018, 34 pages.

Huawei et al., "Sidelink PHY structure and procedure for NR V2X," R1-1810138, 3GPP TSG RAN WG1 Meeting #94bis, Oct. 2018, 17 pages.

Huawei et al., "Bandwidth Parts and Resource Pools for NR V2X sidelink," R2-1816973, 3GPP TSG-RAN WG2 Meeting #104, Nov. 2018, 6 pages.

Ericsson, "Physical layer structures of NR V2X," Tdoc R1-1811592, 3GPP TSG-RAN WG1 Meeting #94bis, Oct. 2018, 16 pages.

* cited by examiner

FIG. 4
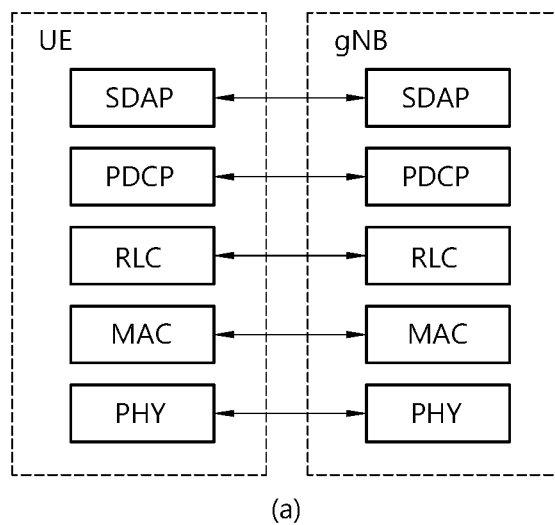
(a)
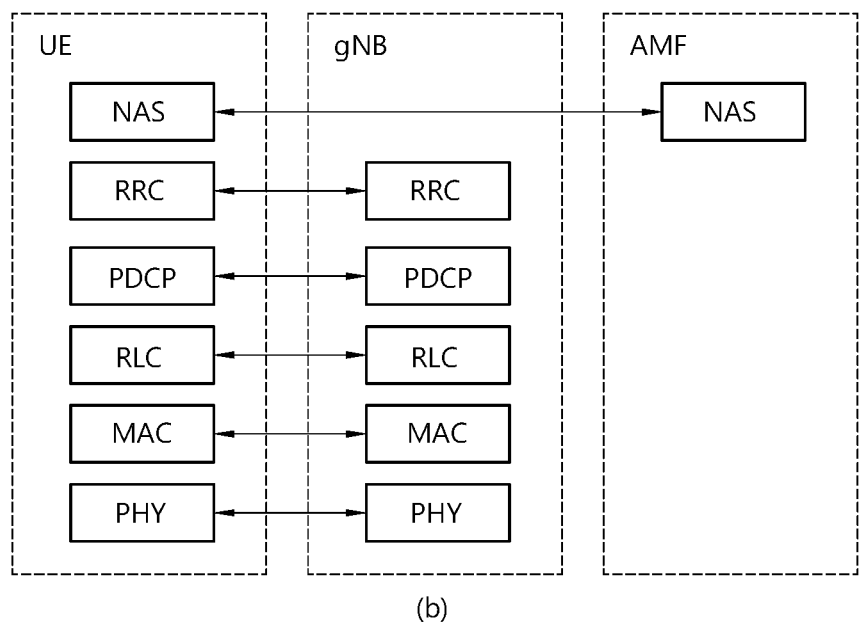
(b)

FIG. 8
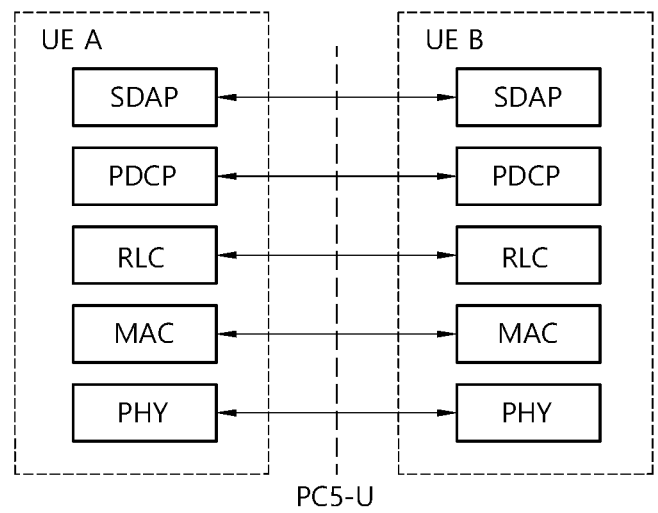
(a)
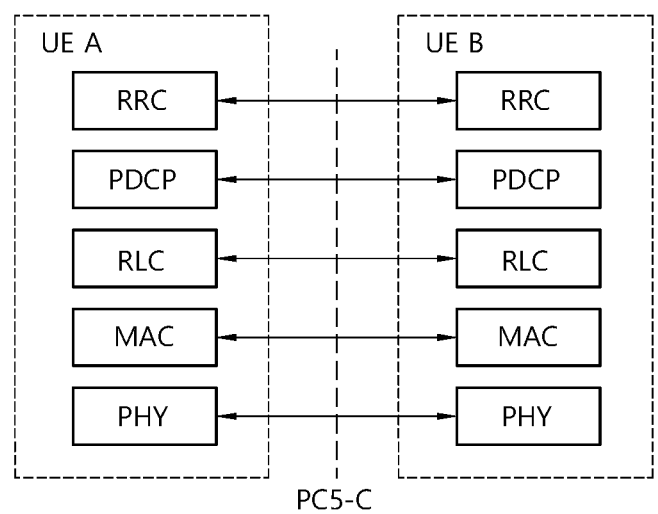
(b)

METHOD AND APPARATUS FOR PERFORMING BWP-BASED SIDELINK COMMUNICATION IN NR V2X

CROSS-REFERENCE TO RELATED APPLICATIONS

This application is the National Stage filing under 35 U.S.C. 371 of International Application No. PCT/KR2020/000591, filed on Jan. 13, 2020, which claims the benefit of U.S. Provisional Patent Application No. 62/791,727, filed on Jan. 11, 2019, the contents of which is hereby incorporated by reference herein in its entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, if a plurality of bandwidth parts (BWPs) are configured for the UE, the UE may perform BWP switching. For example, if the UE performs BWP switching between the Uu BWP and the SL BWP, switching latency may occur. Herein, for example, during a period in which the switching latency occurs, the UE may not be able to perform any transmission operation and/or reception operation. Accordingly, there is a need to propose a method for solving the problem caused by the switching latency and an apparatus supporting the same.

Technical Solutions

In one embodiment, provided is a method for performing wireless communication by a first device. The method may comprise: transmitting, to a second device, information related to a first resource on a sidelink (SL) bandwidth part (BWP); and performing, from the second device, SL reception based on a second resource on the SL BWP, wherein the second resource does not overlap with the first resource.

In one embodiment, provided is a method for performing wireless communication by a second device. The method may comprise: receiving, from a first device, information related to a first resource on a sidelink (SL) bandwidth part (BWP); selecting a second resource on the SL BWP based on the information related to the first resource; and performing, to the first device, SL transmission based on the second resource, wherein the second resource does not overlap with the first resource.

Effects of the Disclosure

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
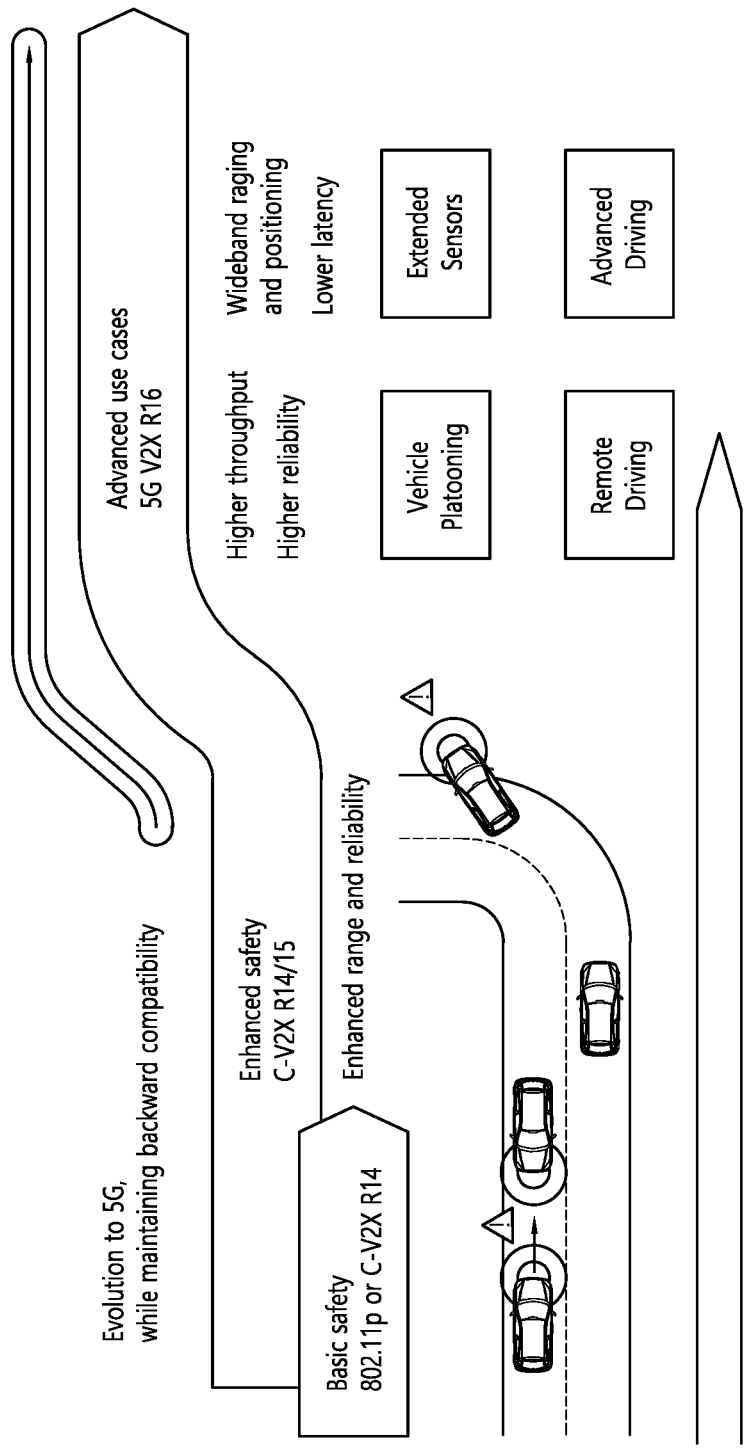
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
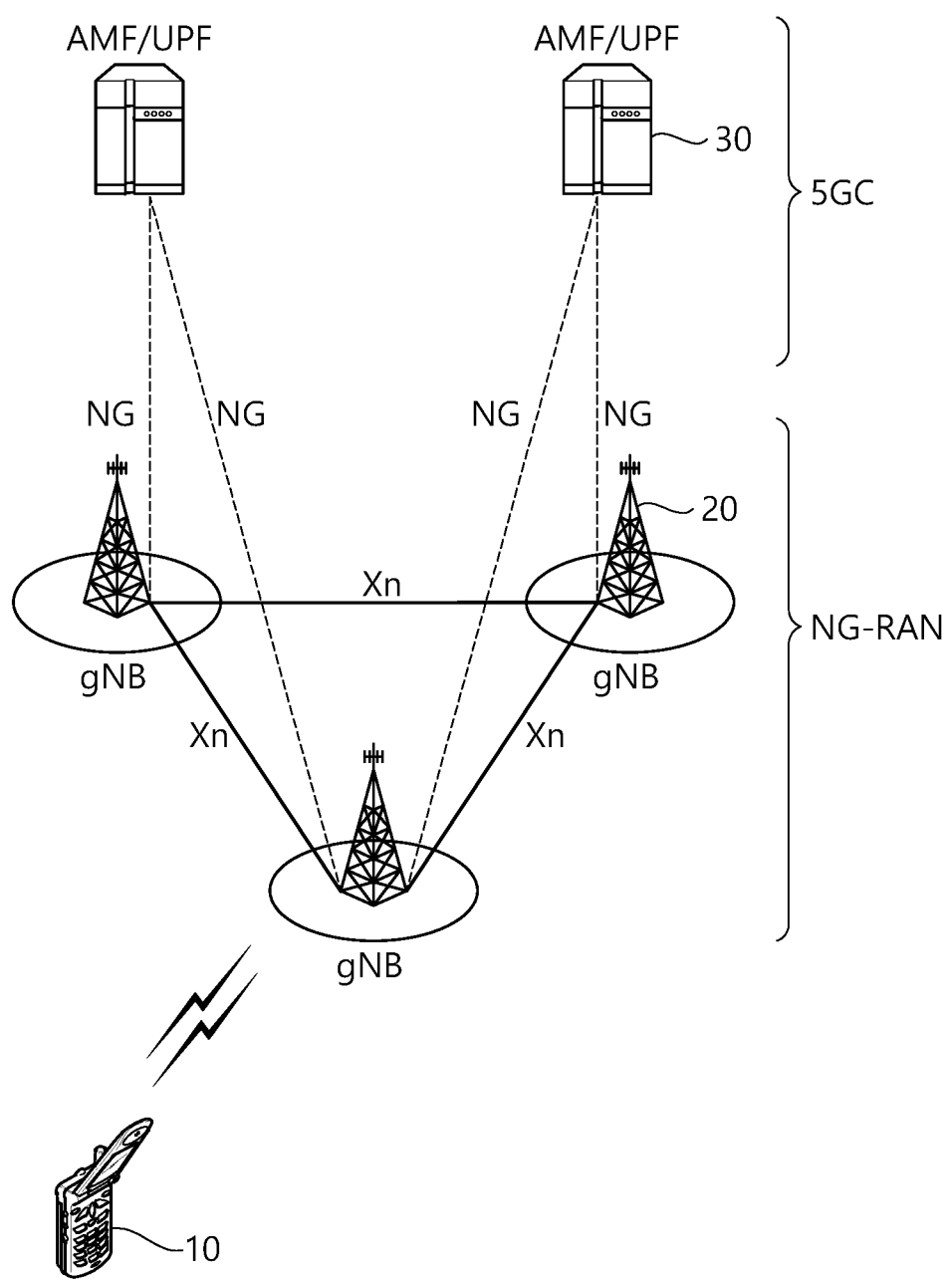
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
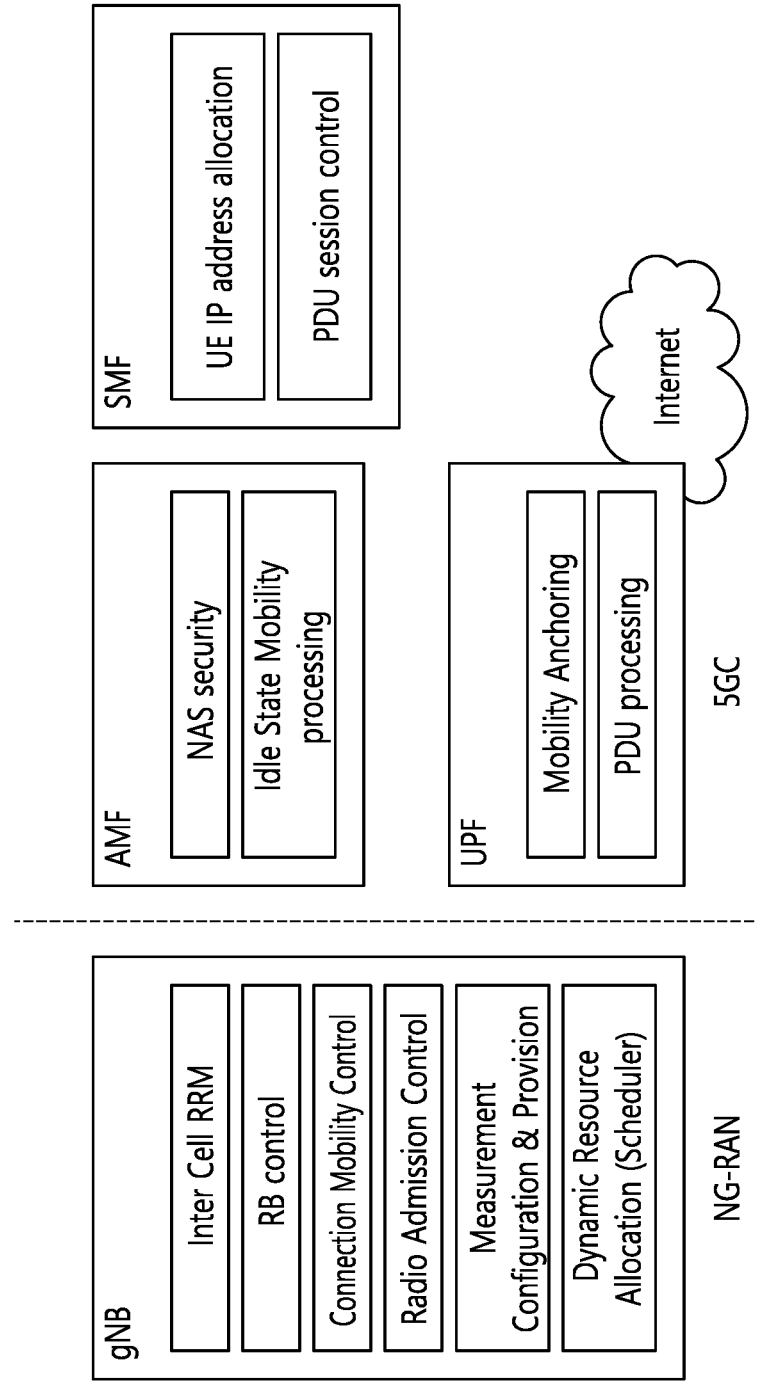
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
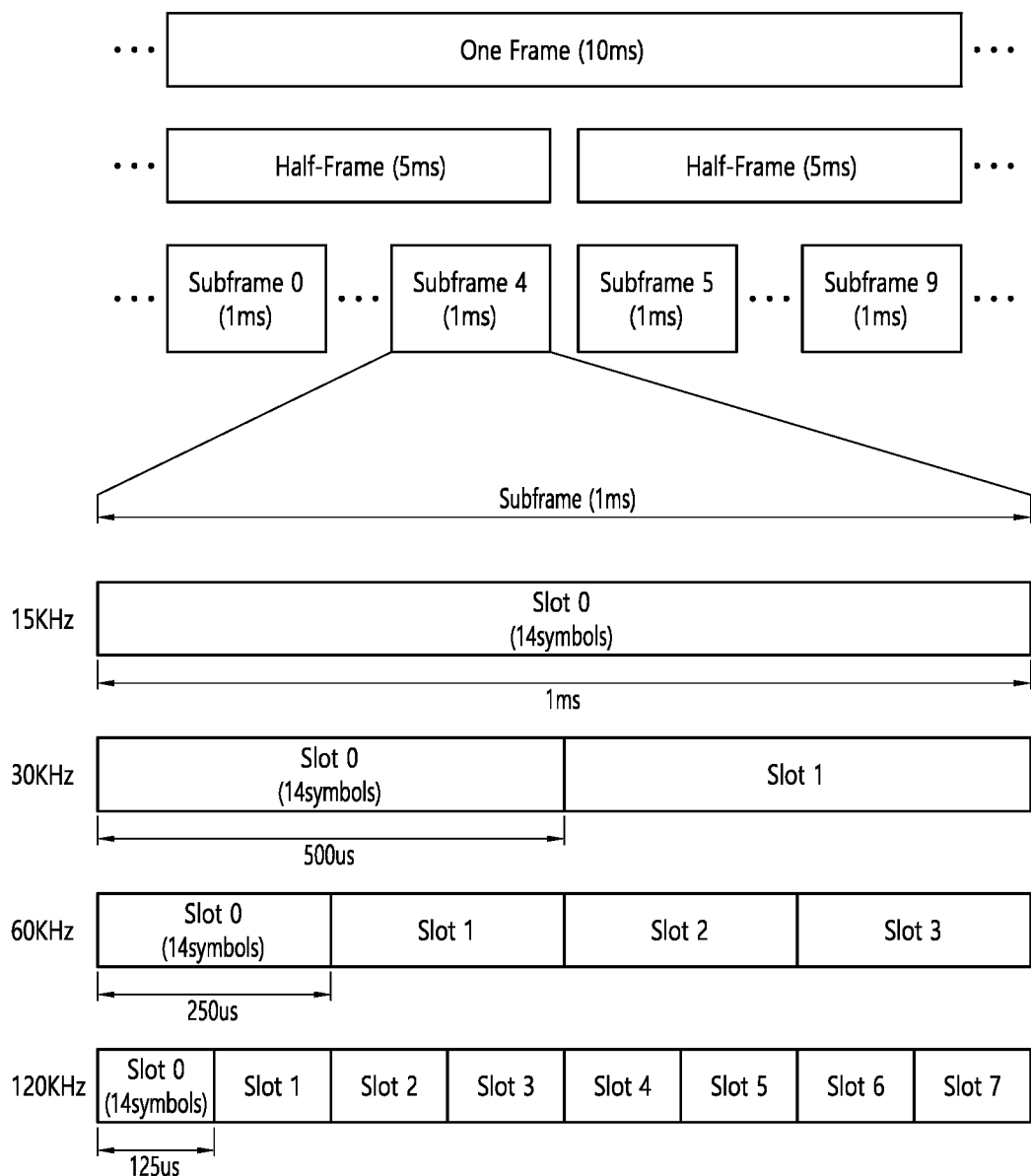
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2^U) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
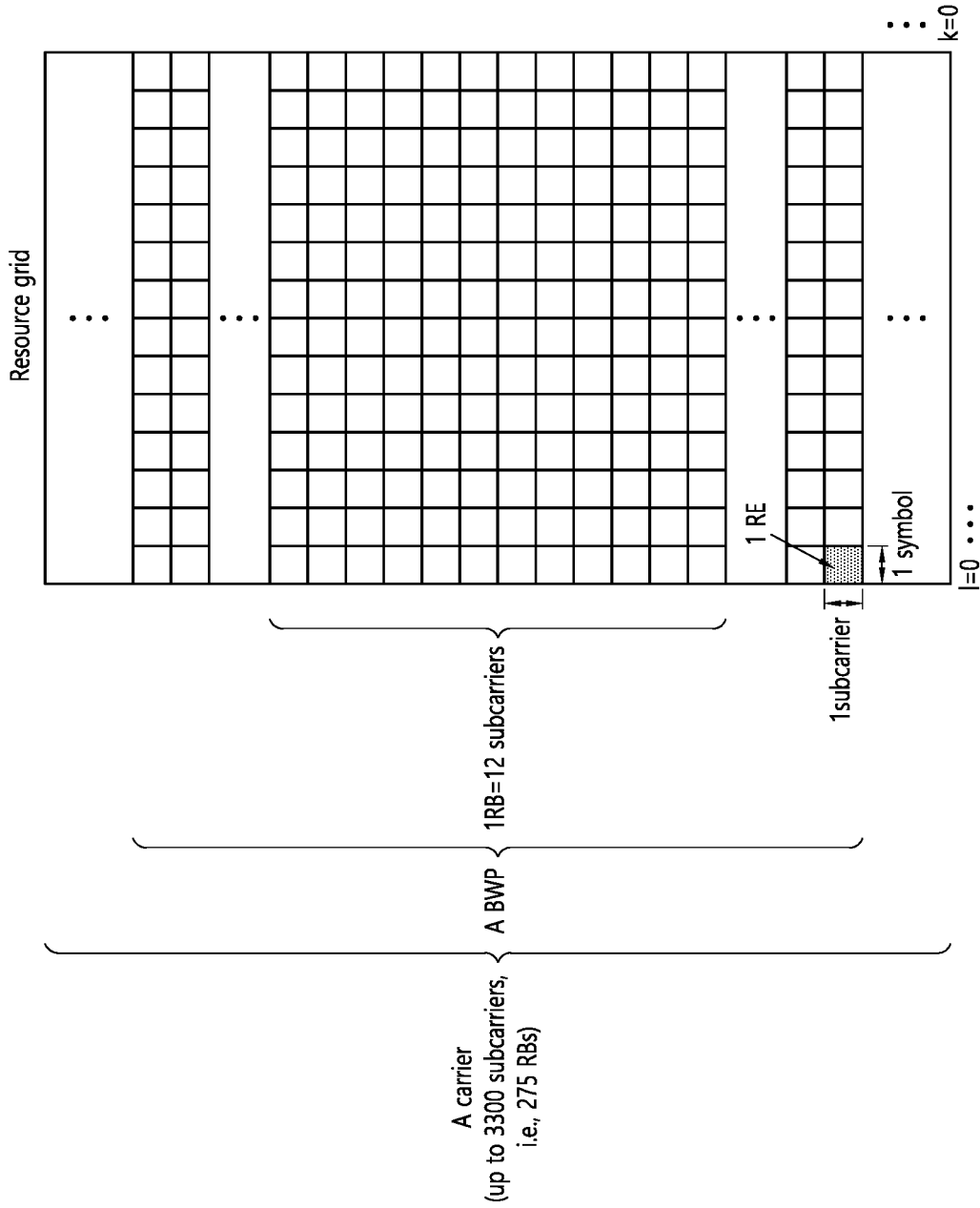
FIG. 6 shows a structure of a slot of an NR frame, in accordance with an embodiment of the present disclosure.

FIG. 6 shows a structure of a slot of an NR frame, in accordance with an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
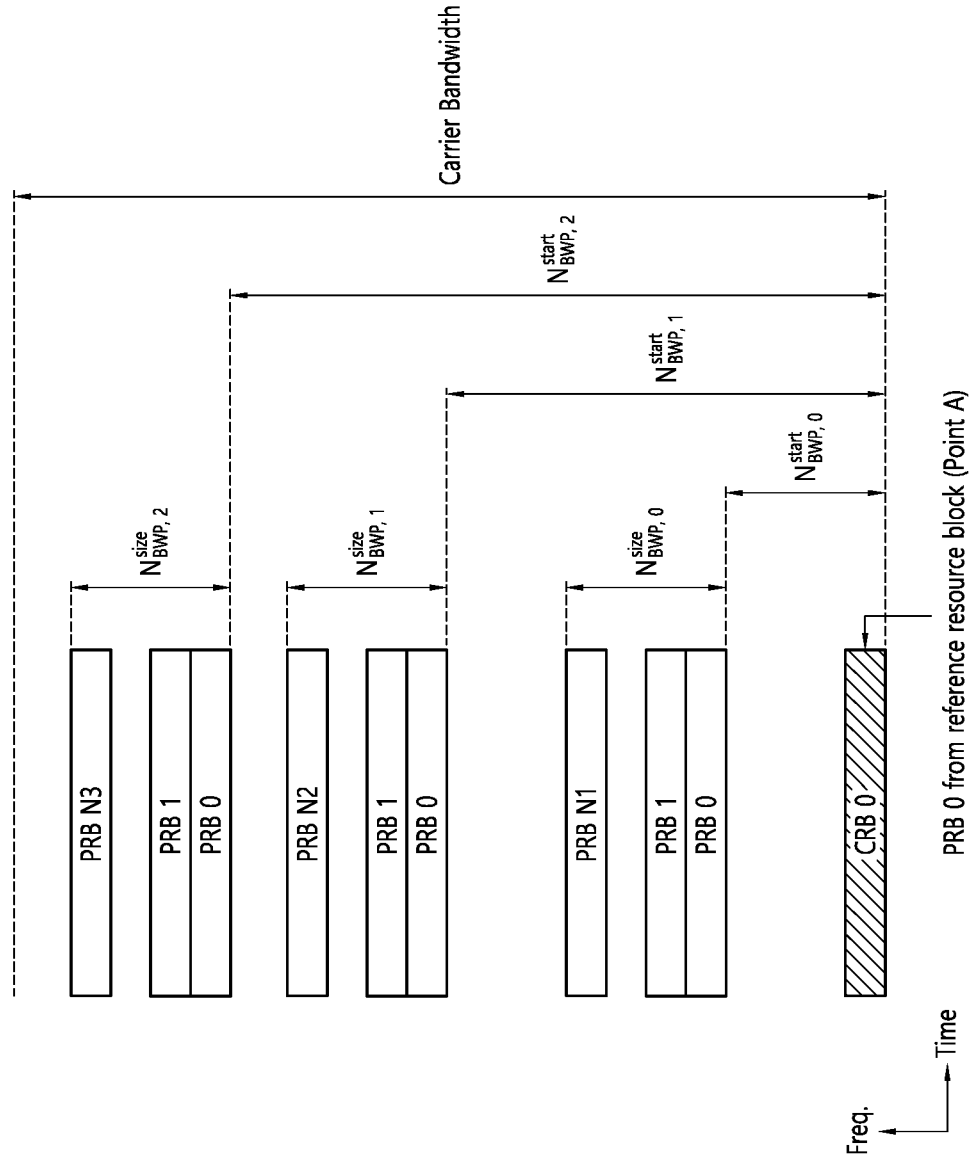
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
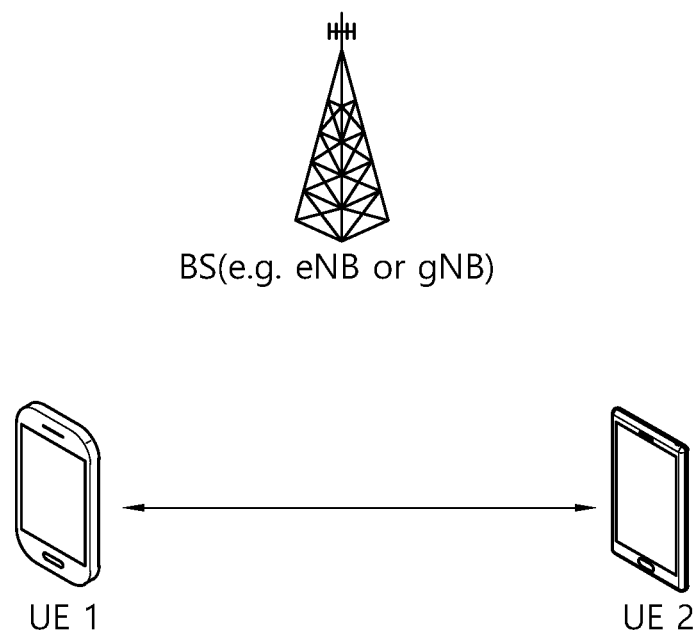
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
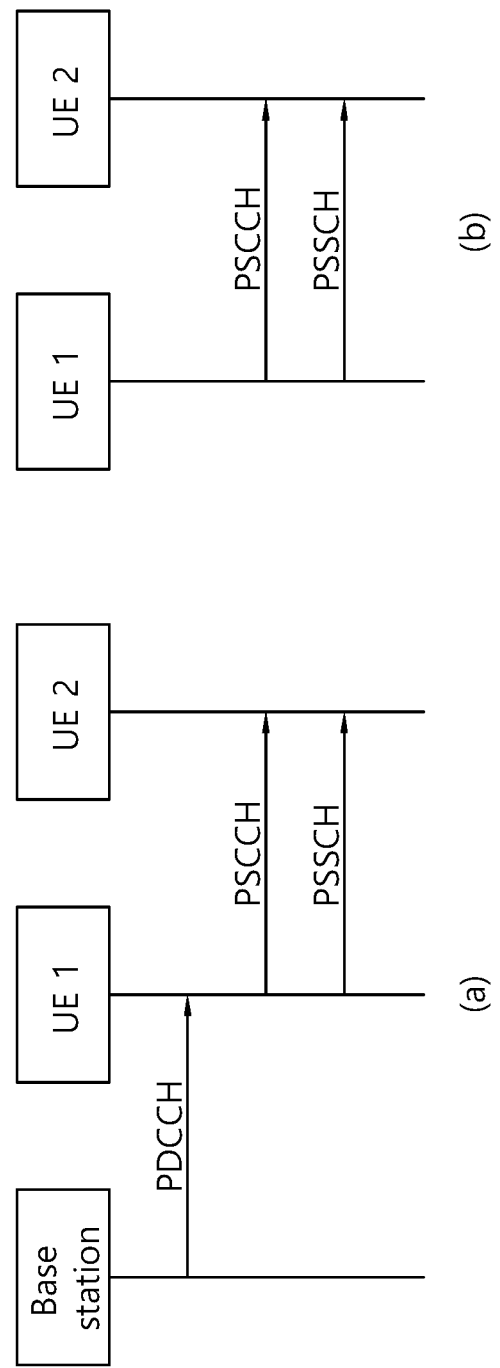
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
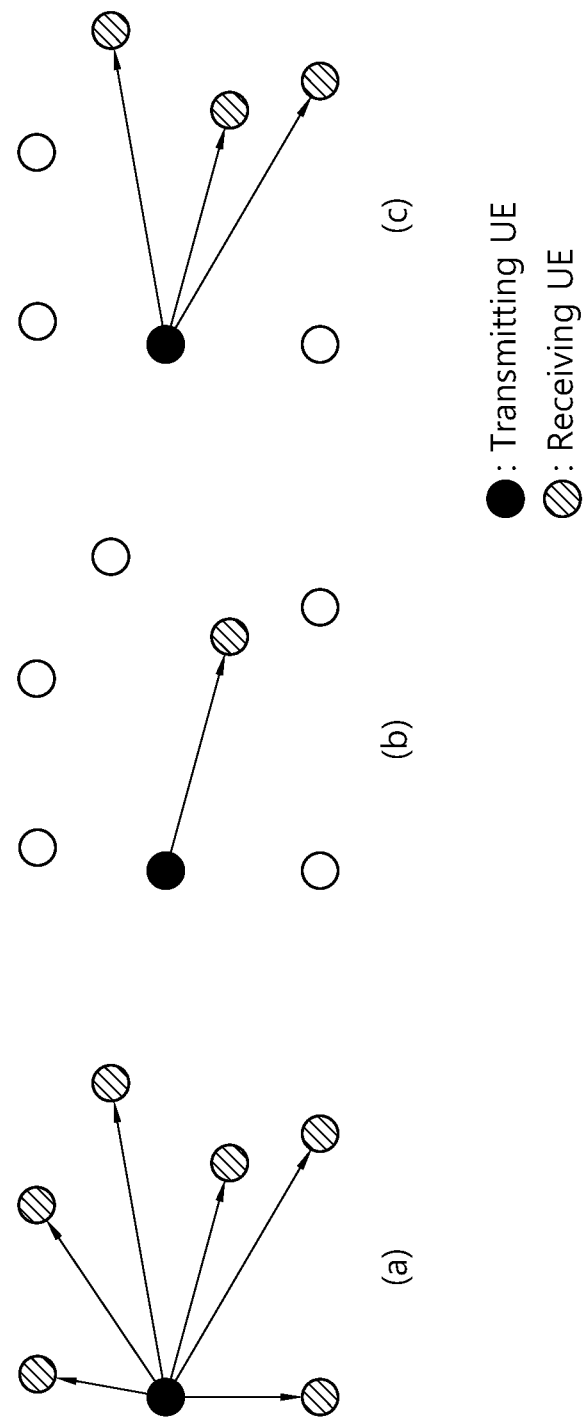
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, it is necessary for the UE to select resource(s) for SL transmission efficiently. Hereinafter, according to various embodiments of the present disclosure, a method for selecting resource(s) for SL transmission efficiently by a UE and an apparatus supporting the same will be described. In various embodiments of the present disclosure, SL communication may include V2X communication.

At least one proposed method proposed according to various embodiments of the present disclosure may be applied to at least one of unicast communication, groupcast communication, and/or broadcast communication.

At least one proposed method proposed according to various embodiments of the present disclosure may be applied to not only SL communication or V2X communication based on PC5 interface or SL interface (e.g., PSCCH, PSSCH, PSBCH, PSSS/SSSS, etc.), but also SL communication or V2X communication based on Uu interface (e.g., PUSCH, PDSCH, PDCCH, PUCCH, etc.).

In various embodiments of the present disclosure, receiving operations of a UE may include decoding operations and/or receiving operations of a sidelink channel and/or sidelink signal (e.g., PSCCH, PSSCH, PSFCH, PSBCH, PSSS/SSSS, and so on). Receiving operations of a UE may include decoding operations and/or receiving operations of a WAN DL channel and/or a WAN DL signal (e.g., PDCCH, PDSCH, PSS/SSS, and so on). Receiving operations of a UE may include sensing operations and/or CBR measurement operations. In various embodiments of the present disclosure, sensing operations of a UE may include a PSSCH-RSRP measurement operation based on a PSSCH DM-RS sequence, a PSSCH-RSRP measurement operation based on a PSSCH DM-RS sequence, which is scheduled by a PSCCH that is successfully decoded by the UE, a sidelink RSSI (S-RSSI) measurement operation, and/or a S-RSSI measurement operation based on a subchannel related with a V2X resource pool. In various embodiments of the present disclosure, transmitting operations of the UE may include transmitting operations of a sidelink channel and/or sidelink signal (e.g., PSCCH, PSSCH, PSFCH, PSBCH, PSSS/SSSS, and so on). Transmitting operations of the UE may include transmitting operations of a WAN UL channel and/or a WAN UL signal (e.g., PUSCH, PUCCH, SRS, and so on). In various embodiments of the present disclosure, a synchronization signal may include a SLSS and/or PSBCH.

In various embodiments of the present disclosure, configuration may include signaling, signaling from a network, configuration from a network, and/or a pre-configuration from a network. In various embodiments of the present disclosure, definition may include signaling, signaling from a network, configuration from a network, and/or a pre-configuration from a network. In various embodiments of the present disclosure, designation may include signaling, signaling from a network, configuration from a network, and/or a pre-configuration from a network.

In various embodiments of the present disclosure, ProSe Per Packet Priority (PPPP) may be replaced with ProSe Per Packet Reliability (PPPR), and PPPR may be replaced with PPPP. In various embodiments of the present disclosure, as the PPPP value becomes smaller, this may indicate a high priority level, and, as the PPPP value becomes greater, this may indicate a low priority level. In various embodiments of the present disclosure, as the PPPR value becomes smaller, this may indicate a high reliability level, and, as the PPPR value becomes greater, this may indicate a low reliability level. For example, a PPPP value related to a service, packet, or message related to a high priority level may be smaller than a PPPP value related to a service, packet or message related to a low priority level. For example, a PPPR value related to a service, packet or message related to high reliability level may be smaller than a PPPR value related to a service, packet or message related to low reliability level.

In various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In various embodiments of the present disclosure, a carrier may be interpreted as at least one of a BWP and/or a resource pool, and vice versa. For example, a carrier may include at least one of a BWP and/or a resource pool. For example, a carrier may include one or more BWPs. For example, a BWP may include one or more resource pools.

Figure 12:
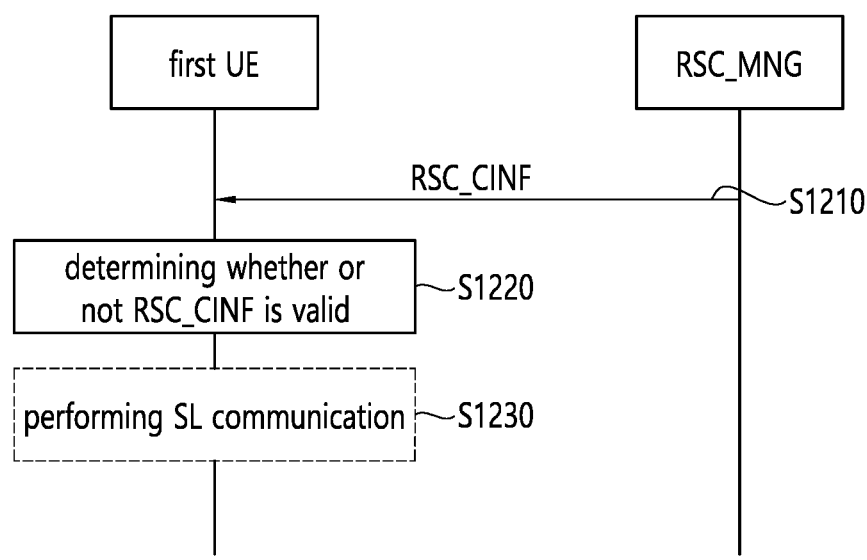
FIG. 12 shows a procedure for a UE to determine validity of information related to SL resource(s), in accordance with an embodiment of the present disclosure.

FIG. 12 shows a procedure for a UE to determine validity of information related to SL resource(s), in accordance with an embodiment of the present disclosure.

Referring to FIG. 12, in step S1210, a first UE may receive RSC_CINF from RSC_MNG. For example, RSC_MNG may signal RSC_CINF to one or more UEs through a pre-defined channel. For example, RSC_MNG may be at least one of devices (100, 200) other than the first UE, a second UE, a road side unit (RSU), and/or an entity for managing/scheduling SL resource(s). For example, RSC_CINF may be referred to as information related to SL resource(s).

For example, RSC_MNG may limit or restrict resource pool(s) of another UE (e.g., the first UE). For example, RSC_MNG may transmit information for restricting or limiting transmission resource pool(s) and/or reception resource pool(s) of another UE (e.g., the first UE).

For example, RSC_MNG may exclude resource pool(s) of another UE (e.g., the first UE). For example, RSC_MNG may transmit information for excluding transmission resource pool(s) and/or reception resource pool(s) of another UE (e.g., the first UE).

For example, RSC_MNG may schedule resource(s) of another UE (e.g., the first UE). For example, RSC_MNG may transmit information for scheduling transmission resource(s) and/or reception resource(s) of another UE (e.g., the first UE).

For example, RSC_MNG may assist resource selection of another UE (e.g., the first UE). For example, RSC_MNG may transmit assistance information for transmission resource selection and/or reception resource selection of another UE (e.g., the first UE).

For example, RSC_CINF may include information for restricting or limiting resource pool(s) related to SL. For example, RSC_CINF may include information for restricting or limiting resource pool(s) related to SL transmission. For example, RSC_CINF may include information for restricting or limiting resource pool(s) related to SL reception. In this case, for example, a UE receiving the RSC_CINF may select resource(s) for SL communication from within the resource pool(s) related to SL.

For example, RSC_CINF may include information for excluding resource pool(s) related to SL. For example, RSC_CINF may include information for excluding resource pool(s) related to SL transmission. For example, RSC_CINF may include information for excluding resource pool(s) related to SL reception. In this case, for example, a UE receiving the RSC_CINF may select resource(s) for SL communication outside the resource pool(s) related to SL.

For example, RSC_CINF may include information for scheduling resource(s) related to SL. For example, RSC_CINF may include information for scheduling resource(s) related to SL transmission. For example, RSC_CINF may include information for scheduling resource(s) related to SL reception. In this case, for example, a UE receiving the RSC_CINF may perform SL communication using the resource(s) related to SL.

For example, RSC_CINF may include information that assists a UE to select resource(s) related to SL. For example, RSC_CINF may include information that assists the UE to select resource(s) related to SL transmission. For example, RSC_CINF may include information that assists the UE to select resource(s) related to SL reception. In this case, for example, a UE receiving the RSC_CINF may select resource(s) for SL communication by using the RSC_CINF.

Additionally, for example, RSC_CINF may include at least one of target session information and/or identifier information of a target UE (e.g., identifier information of the first UE).

For example, RSC_MNG may periodically transmit RSC_ CINF. For example, RSC_MNG may transmit RSC_CINF based on a pre-defined period. For example, RSC_MNG may transmit RSC_CINF based on a timer. For example, if the timer expires, RSC_MNG may transmit RSC_CINF. For example, a value of the pre-defined period and/or a value of the timer may be pre-configured by a network or a base station. For example, RSC_MNG may transmit the value of the pre-defined period and/or the value of the timer to another UE through PC5 RRC signaling. For example, another UE may be a UE that has established a session with RSC_MNG.

For example, RSC_MNG may transmit RSC_CINF to the first UE according to a request of the first UE. For example, the first UE may perform CBR measurement for scheduled resource(s) or restricted resource pool(s) by RSC_CINF previously received from RSC_MNG. In addition, if the measured CBR value is equal to or greater than a pre-configured threshold, the first UE may transmit a request of transmission of RSC_CINF to RSC_MNG. Herein, for example, when the first UE requests RSC_MNG to transmit RSC_CINF, the first UE may also transmit the measured CBR information. In this case, RSC_MNG may transmit a new RSC_CINF to the first UE according to the request of transmission of RSC_CINF from the first UE. Alternatively, for example, the first UE may perform occupancy ratio measurement for scheduled resource(s) or restricted resource pool(s) by RSC_CINF previously received from RSC_MNG. In addition, if the measured occupancy ratio value is equal to or greater than a pre-configured threshold, the first UE may transmit a request of transmission of RSC_CINF to RSC_MNG. Herein, for example, when the first UE requests RSC_MNG to transmit RSC_CINF, the first UE may also transmit the measured occupancy ratio information. In this case, RSC_MNG may transmit a new RSC_CINF to the first UE according to the request of transmission of RSC_CINF from the first UE. For example, the new RSC_CINF may include at least one of information for scheduling updated SL resource(s) and/or information for restricting updated SL resource(s).

For example, RSC_MNG may perform CBR measurement and/or occupancy ratio measurement for scheduled resource(s) or restricted resource pool(s) to the first UE by the RSC_MNG. In addition, if the measured CBR and/or occupancy ratio value is equal to or greater than a pre-configured threshold, RSC_MNG may transmit a new RSC_CINF to the first UE. For example, the new RSC_CINF may include at least one of information for scheduling updated SL resource(s) and/or information for restricting updated SL resource(s).

In step S1220, the first UE may determine whether or not RSC_CINF is valid. For example, according to at least one rule proposed below, the first UE receiving RSC_CINF from RSC_MNG may determine and/or assume validity of the RSC_CINF.

For example, in case of SL unicast communication, the first UE may determine that the RSC_CINF is valid during time in which a session related to the unicast communication is valid. For example, in case of SL groupcast communication, the first UE may determine that the RSC_CINF is valid during time in which a session related to the groupcast communication is valid. For example, in case of SL broadcast communication, the first UE may determine that the RSC_CINF is valid during time in which a session related to the broadcast communication is valid. For example, the session may be valid until an RLF related to the session is declared. For example, if the RLF related to the session is declared, the session may not be valid. For example, the session may be valid before OUT-OF-SYNCH occurs more than or equal to a pre-configured threshold number. For example, if OUT-OF-SYNCH occurs more than or equal to a pre-configured threshold number, the session may not be valid. For example, the session may be valid before OUT-OF-SYNCH continuously occurs more than or equal to a pre-configured threshold number. For example, if OUT-OF-SYNCH continuously occurs more than or equal to a pre-configured threshold number, the session may not be valid. For example, the session may be valid until SL-related quality less than or equal to a pre-configured threshold is measured/reported. For example, if SL-related quality less than or equal to a pre-configured threshold is measured/reported, the session may not be valid. For example, the session may be valid until SL-related quality less than or equal to a pre-configured threshold is measured/reported continuously. For example, if SL-related quality less than or equal to a pre-configured threshold is measured/reported continuously, the session may not be valid. For example, the SL-related quality may include at least one of SL CSI, RSRP, and/or RSRQ.

Additionally/alternatively, for example, until a pre-configured timer expires, the first terminal UE determine that the RSC_CINF is valid. For example, the timer may be pre-configured from RSC_MNG or a network.

Additionally/alternatively, for example, until strength and/or quality of a signal transmitted by RSC_MNG becomes smaller than a pre-configured threshold, the first UE may determine that the RSC_CINF is valid. For example, until strength and/or quality of a signal received from RSC_MNG becomes smaller than a pre-configured threshold, the first UE may determine that the RSC_CINF is valid. For example, if strength and/or quality of a signal received from RSC_MNG is greater than or equal to a pre-configured threshold, the first UE may determine that the RSC_CINF is valid. For example, strength and/or quality of the signal may include at least one of RSRP and/or RSRQ. For example, the signal may be a reference signal.

Additionally/alternatively, for example, until strength and/or quality of a signal transmitted by RSU becomes smaller than a pre-configured threshold, the first UE may determine that the RSC_CINF is valid. For example, until strength and/or quality of a signal received from RSU becomes smaller than a pre-configured threshold, the first UE may determine that the RSC_CINF is valid. For example, if strength and/or quality of a signal received from RSU is greater than or equal to a pre-configured threshold, the first UE may determine that the RSC_CINF is valid. For example, strength and/or quality of the signal may include at least one of RSRP and/or RSRQ. For example, the signal may be a reference signal.

For example, the timer may be configured differently per a type of SL communication, per a type of SL service, per a priority of SL service, per a ProSe Per Packet Priority (PPPP) related to SL service, and per a ProSe Per Packet Reliability (PPPR) related to SL service, per a delay budget of SL service, and/or per a channel busy ratio (CBR), partially or completely. Additionally/alternatively, for example, the threshold may be configured differently per a type of SL communication, per a type of SL service, per a priority of SL service, per a ProSe Per Packet Priority (PPPP) related to SL service, and per a ProSe Per Packet Reliability (PPPR) related to SL service, per a delay budget of SL service, and/or per a channel busy ratio (CBR), partially or completely. For example, the threshold may be a threshold related to the strength and/or quality of the signal. For example, the type of SL communication may include at least one of unicast communication, groupcast communication, and/or broadcast communication.

Additionally, in step S1230, the first UE may select resource(s) for SL communication. For example, based on whether or not RSC_CINF is valid, the first UE may select resource(s) for SL communication.

For example, if RSC_CINF is valid, the first UE may select resource(s) for SL communication by using information included in RSC_CINF. For example, if RSC_CINF includes information for scheduling SL resource(s), the first UE may select the SL resource(s) and may perform SL communication by using the selected SL resource(s). For example, if RSC_CINF includes information for restricting SL resource pool(s), the first UE may select SL resource(s) within the SL resource pool(s) and may perform SL communication by using the selected SL resource(s). For example, if RSC_CINF includes information for excluding SL resource pool(s), the first UE may select SL resource(s) outside the SL resource pool(s) and may perform SL communication by using the selected SL resource(s).

For example, if RSC_CINF is not valid, the first UE may independently select resource(s) for SL communication. For example, the first UE may select SL resource(s) regardless of information included in RSC_CINF.

According to an embodiment of the present disclosure, there may be no guarantee that the RSC_CINF signaled from the RSC_MNG by the first UE is ideally determined. For example, there may be no guarantee that the information for restricting SL resource pool(s) received by the first UE from the second UE was ideally determined by the second UE. In this case, it is necessary to allow the first UE to use resource(s) other than resource(s) indicated by RSC_CINF. For example, it is necessary for the first UE to perform SL communication by using resource(s) other than the resource(s) indicated by RSC_CINF.

For example, the first UE may receive RSC_CINF including information for scheduling SL resource(s), and the first UE may perform CBR measurement for the SL resource(s). In this case, if the CBR measurement value is greater than or equal to a pre-configured threshold, it is allowed for the first UE to perform SL communication on resource(s) other than the SL resource(s). For example, the first UE may exceptionally perform SL communication on the resource(s) other than the SL resource(s).

Additionally/alternatively, for example, the first UE may receive RSC_CINF including information for scheduling SL resource(s), and the first UE may perform occupancy ratio measurement for the SL resource(s). In this case, if the occupancy ratio is greater than or equal to a pre-configured threshold, it is allowed for the first UE to perform SL communication on resource(s) other than the SL resource(s). For example, the first UE may exceptionally perform SL communication on the resource(s) other than the SL resource(s).

Additionally/alternatively, for example, the first UE may receive RSC_CINF including information for restricting SL resource pool(s), and the first UE may perform CBR measurement for the SL resource pool(s). In this case, if the CBR measurement value is greater than or equal to a pre-configured threshold, it is allowed for the first UE to perform SL communication on resource pool(s) other than the SL resource pool(s). For example, the first UE may exceptionally perform SL communication on the resource pool(s) other than the SL resource pool(s).

Additionally/alternatively, for example, the first UE may receive RSC_CINF including information for restricting SL resource pool(s), and the first UE may perform occupancy ratio measurement for the SL resource pool(s). In this case, if the occupancy ratio is greater than or equal to a pre-configured threshold, it is allowed for the first UE to perform SL communication on resource pool(s) other than the SL resource pool(s). For example, the first UE may exceptionally perform SL communication on the resource pool(s) other than the SL resource pool(s).

For example, in case of at least one of transmission for a message related to a service of a relatively high priority, transmission for a message related to a relatively low PPPR value, transmission for a message related to a relatively low PPPP value, and/or transmission for a message related to a relatively low latency budget value, it is allowed for the first UE to perform SL communication on the resource pool(s) other than the SL resource pool(s) or on the resource(s) other than the SL resource(s). For example, in case of at least one of transmission for a message related to a service of a priority higher than a pre-configured threshold, transmission for a message related to a PPPR value less than a pre-configured threshold, transmission for a message related to a PPPP value less than a pre-configured threshold, and/or transmission for a message related to a latency budget value less than a pre-configured threshold, it is allowed for the first UE to perform SL communication on the resource pool(s) other than the SL resource pool(s) or on the resource(s) other than the SL resource(s). For example, in case of at least one of transmission for a message related to a service of a priority lower than a pre-configured threshold, transmission for a message related to a PPPR value larger than a pre-configured threshold, transmission for a message related to a PPPP value larger than a pre-configured threshold, and/or transmission for a message related to a latency budget value larger than a pre-configured threshold, it is not allowed for the first UE to perform SL communication on the resource pool(s) other than the SL resource pool(s) or on the resource(s) other than the SL resource(s).

According to an embodiment of the present disclosure, a priority order of synchronization sources may be configured differently per a type of SL communication or a type of SL service. For example, the type of SL communication or the type of SL service may include at least one of unicast, groupcast, and broadcast.

For example, in a procedure for performing synchronization, the UE may be configured to prioritize SLSS in unicast, and may be configured to prioritize synchronization signal(s) or synchronization source(s) related to GNSS in broadcast. For example, in a procedure for performing synchronization, the UE may be configured to prioritize SLSS in unicast, and may be configured to prioritize synchronization signal(s) or synchronization source(s) related to a base station in broadcast. For example, the UE may configure SLSS as the highest priority in unicast, and may configure GNSS or a base station as the highest priority in broadcast. For example, the SLSS may be SLSS received by the UE from another UE (which has a session with the UE).

Additionally/alternatively, for example, in a procedure for performing synchronization, the UE may be configured to prioritize SLSS in groupcast, and may be configured to prioritize GNSS in broadcast. For example, the UE may configure SLSS as the highest priority in groupcast, and may configure GNSS as the highest priority in broadcast.

Meanwhile, in case the proposed rule is applied on a carrier in which both unicast and/or groupcast and broadcast are configured, if it is necessary for a UE participating in unicast and/or groupcast and broadcast (e.g., receiving UE) to receive all messages related to the unicast and/or groupcast and broadcast, complexity of the UE may increase. For example, the complexity related to synchronization tracking and/or tuning of the UE may increase.

Therefore, for example, according to the type of SL communication or the type of SL service configured for the carrier, which synchronization source is prioritized by the UE may be configured differently. For example, according to the type of SL communication or the type of SL service configured for the carrier, the UE may configure or determine the synchronization source of the highest priority differently.

For example, in case only unicast communication is configured for the carrier, the UE may prioritize SLSS. For example, in case only unicast communication is configured for the carrier, the UE may determine SLSS as the highest priority. For example, the SLSS may be SLSS received by the UE from another UE (which has a session with the UE).

For example, in case only unicast communication and/or groupcast communication is configured for the carrier, the UE may prioritize SLSS. For example, in case only unicast communication and/or groupcast communication is configured for the carrier, the UE may determine SLSS as the highest priority. For example, the SLSS may be SLSS received by the UE from another UE (which has a session with the UE).

For example, in case unicast communication and broadcast communication are configured for the carrier, the UE may prioritize synchronization signal(s) or synchronization source(s) related to GNSS. For example, in case unicast communication and broadcast communication are configured for the carrier, the UE may prioritize synchronization signal(s) or synchronization source(s) related to a base station. For example, in case unicast communication and broadcast communication are configured together on the carrier, the UE may determine GNSS or a base station as the highest priority.

For example, in case unicast communication and/or groupcast communication is configured for the carrier together with broadcast communication, the UE may prioritize synchronization signal(s) or synchronization source(s) related to GNSS. For example, in case unicast communication and/or groupcast communication is configured for the carrier together with broadcast communication, the UE may prioritize synchronization signal(s) or synchronization source(s) related to a base station. For example, in case unicast communication and/or groupcast communication is configured for the carrier together with broadcast communication, the UE may determine GNSS or a base station as the highest priority.

According to various embodiments of the present disclosure, RSC_MNG may efficiently maintain or manage QoS related to SL communication. For example, the UE may select resource(s) for SL communication by using RSC_CINF received from RSC_MNG. Accordingly, in case a plurality of UEs select resource(s) for SL communication based on RSC_CINF, a problem of conflicting selected resource(s) can be alleviated.

According to various embodiments of the present disclosure, the UE can determine/select valid information from among RSC_CINF received from RSC_MNG. For example, if the valid information is used/applied, a problem of conflicting selected resource(s) between UEs can be alleviated. Additionally/alternatively, for example, QoS maintenance/management related to SL communication can be achieved more efficiently. In addition, according to various embodiments of the present disclosure, complexity related to synchronization tracking and/or tuning of the UE can be reduced. For example, on a carrier, the complexity related to synchronization tracking and/or tuning of a receiving UE can be reduced.

Meanwhile, as described above, in a NR Uu system, BWP(s) may be defined in carrier(s) for UL transmission and/or DL reception of UE(s). Also, like the NR Uu system, BWP(s) may be defined in NR V2X or NR SL. For example, SL BWP(s) may be defined independently of Uu BWP(s). In addition, for example, resource pool(s) for SL communication (e.g., SL transmission and/or SL reception) may be configured for UE(s) within SL BWP(s).

Meanwhile, if a plurality of BWPs are configured for the UE, the UE may perform BWP switching. For example, if the UE performs BWP switching between the Uu BWP and the SL BWP, switching latency may occur. For example, if the UE performs BWP switching between the Uu BWP and the SL BWP, switching latency may occur due to a limitation of (TX and/or RX) RF capability of the UE (e.g., RF BWP limitation). For example, the switching may be an RF chain switching of the UE. For example, the switching may be a TX RF chain switching of the UE. For example, the switching may be an RX RF chain switching of the UE.

Herein, for example, during a period in which the switching latency occurs, the UE may not be able to perform any transmission operation and/or reception operation. For example, during the period in which the switching latency occurs, the UE may not be able to perform any transmission/reception operations related to Uu communication and/or SL communication. In various embodiments of the present disclosure, Uu communication may mean communication between a UE and a base station, and SL communication may mean communication between UEs. Accordingly, there is a need to propose a method for solving the problem caused by the above-described switching latency and an apparatus supporting the same.

According to an embodiment of the present disclosure, the UE may select/reserve transmission resource(s) (of the UE) on the resource pool in the SL BWP. In this case, the UE may exclude specific resource(s). For example, the specific resource(s) may include resource(s) belonging to a (time) period in which the UE should perform a transmission operation related to Uu communication by switching from SL BWP to Uu BWP. For example, the specific resource(s)

may include resource(s) belonging to a (time) period in which the UE should perform a reception operation related to Uu communication by switching from SL BWP to Uu BWP. For example, the specific resource(s) may include resource(s) belonging to a latency (time) period caused by the UE's switching to the Uu BWP. For example, the specific resource(s) may include resource(s) belonging to a latency (time) period caused by the UE's switching from the SL BWP to the Uu BWP. For example, the specific resource(s) may include resource(s) belonging to a latency (time) period caused by the UE's switching from the Uu BWP to the SL BWP.

For example, the UE may transmit/signal assistance information related to transmission resource(s) and/or reception resource(s) preferred by the UE, to other UEs. In this case, the UE may exclude specific resource(s). For example, the specific resource(s) may include resource(s) belonging to a (time) period in which the UE should perform a transmission operation related to Uu communication by switching from SL BWP to Uu BWP. For example, the specific resource(s) may include resource(s) belonging to a (time) period in which the UE should perform a reception operation related to Uu communication by switching from SL BWP to Uu BWP. For example, the specific resource(s) may include resource(s) belonging to a latency (time) period caused by the UE's switching from the SL BWP to the Uu BWP. For example, the specific resource(s) may include resource(s) belonging to a latency (time) period caused by the UE's switching from the Uu BWP to the SL BWP. For example, the assistance information includes at least one of information related to reception resource(s) for which relatively low interference is measured/expected, information related to transmission resource(s) not used for other session-related transmission operations, information related to reception resource(s) not used for other session-related reception operations, information related to resource(s) in which the UE can actually use for transmission, and/or information related to resource(s) in which the UE can actually use for reception.

According to an embodiment of the present disclosure, a first UE may (directly) transmit/signal information related to specific resource(s) to other UEs (hereinafter, a second UE). For example, the specific resource(s) may include resource(s) belonging to a (time) period in which the first UE should perform a transmission operation related to Uu communication by switching from the SL BWP to the Uu BWP. For example, the specific resource(s) may include resource(s) belonging to a (time) period in which the first UE should perform a reception operation related to Uu communication by switching from the SL BWP to the Uu BWP. For example, the specific resource(s) may include resource(s) belonging to a latency (time) period caused by the first UE's switching from the SL BWP to the Uu BWP. For example, the specific resource(s) may include resource(s) belonging to a latency (time) period caused by the first UE's switching from the Uu BWP to the SL BWP. In addition, for example, the second UE, which has received the information related to the specific resource(s) from the first UE, may transmit SL-related message/information to the first UE by using/selecting resource(s) other than the specific resource(s).

Figure 13:
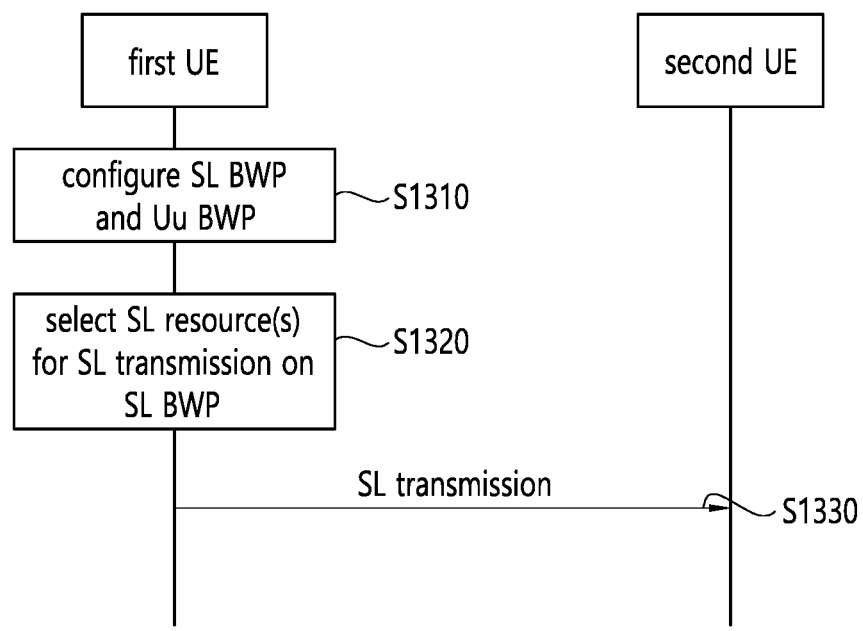
FIG. 13 shows a procedure for performing SL transmission by a first UE, in accordance with an embodiment of the present disclosure.

FIG. 13 shows a procedure for performing SL transmission by a first UE, in accordance with an embodiment of the present disclosure. The embodiment of FIG. 13 may be combined with various embodiments of the present disclosure.

Referring to FIG. 13, in step S1310, the first UE may configure SL BWP(s) and Uu BWP(s). For example, the first UE may configure SL BWP(s) and Uu BWP(s) based on information related to Uu BWP configuration and information related to SL BWP configuration transmitted by a base station. For example, the first UE may configure SL BWP(s) and Uu BWP(s) based on information related to Uu BWP configuration and information related to SL BWP configuration pre-defined in the system.

In step S1320, the first UE may select resource(s) for SL transmission on the SL BWP. For example, the first UE may select resource(s) for SL transmission on resource pool(s) in the SL BWP. In this case, the first UE may not select specific resource(s) as resource(s) for SL transmission. For example, the specific resource(s) may be excluded from the resource(s) for SL transmission. For example, the specific resource(s) may include resource(s) on the SL BWP overlapping in a time domain with a time period in which the first UE switched from the SL BWP to the Uu BWP communicates with the base station on the Uu BWP. For example, the communication may include UL transmission and/or DL reception. For example, the specific resource(s) may include resource(s) on the SL BWP overlapping in a time domain with a time period required for the first UE to perform switching from the SL BWP to the Uu BWP. For example, the specific resource(s) may include resource(s) on the SL BWP overlapping in a time domain with a time period required for the first UE to perform switching from the Uu BWP to the SL BWP.

Figure 14:
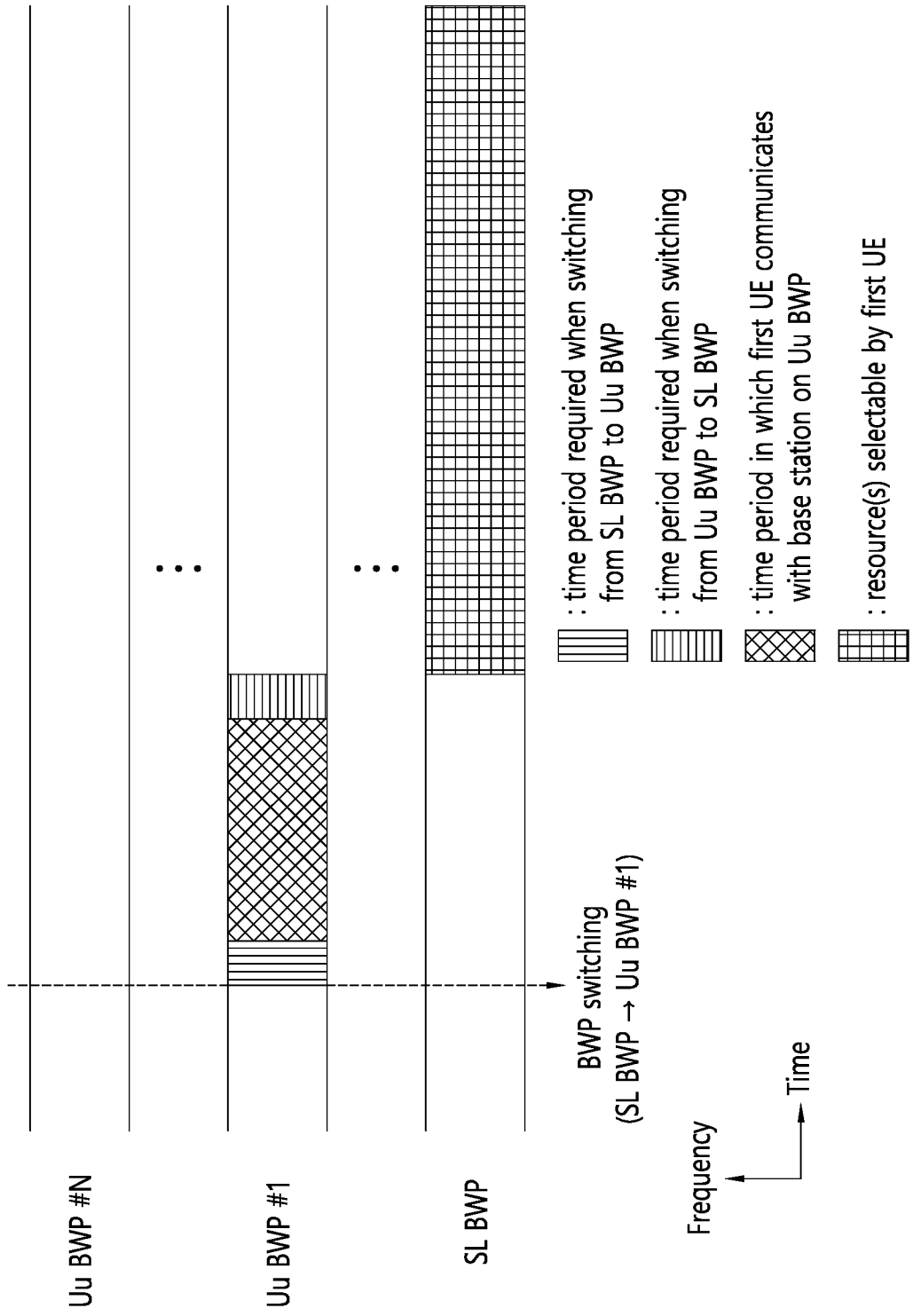
FIG. 14 shows a method for a first UE to select resource(s) for SL transmission on a SL BWP, in accordance with an embodiment of the present disclosure.

FIG. 14 shows a method for a first UE to select resource(s) for SL transmission on a SL BWP, in accordance with an embodiment of the present disclosure. The embodiment of FIG. 14 may be combined with various embodiments of the present disclosure.

Referring to FIG. 14, the first UE may perform BWP switching from a SL BWP to the Uu BWP #1. In this case, for example, a resource domain in which the first UE is able to select within the SL BWP may not include a resource domain overlapping with a time period required when switching from the SL BWP to the Uu BWP. For example, a resource domain in which the first UE is able to select within the SL BWP may not include a resource domain overlapping with a time period required when switching from the Uu BWP to the SL BWP. For example, a resource domain in which the first UE is able to select within the SL BWP may not include a resource domain overlapping with a time period in which the first UE communicates with the base station on the Uu BWP.

Referring back to FIG. 13, in step S1330, the first UE may perform SL transmission by using the selected resource(s). For example, the first UE may perform SL transmission to a second UE by using the selected resource(s).

Figure 15:
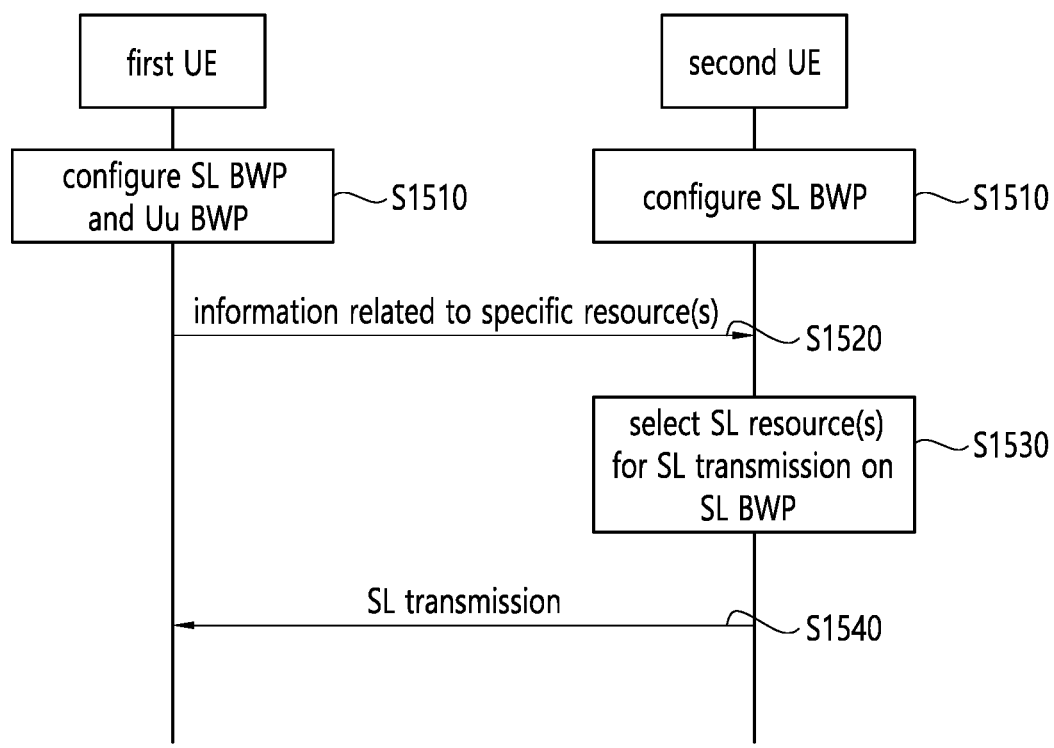
FIG. 15 shows a procedure for performing SL transmission by a second UE, in accordance with an embodiment of the present disclosure.

FIG. 15 shows a procedure for performing SL transmission by a second UE, in accordance with an embodiment of the present disclosure. The embodiment of FIG. 15 may be combined with various embodiments of the present disclosure.

Referring to FIG. 15, in step S1510, a first UE may configure SL BWP(s) and Uu BWP(s). For example, the first UE may configure SL BWP(s) and Uu BWP(s) based on information related to Uu BWP configuration and information related to SL BWP configuration transmitted by a base station. For example, the first UE may configure SL BWP(s) and Uu BWP(s) based on information related to Uu BWP configuration and information related to SL BWP configuration pre-defined in the system.

Additionally, the second UE may configure SL BWP(s). For example, the second UE may configure SL BWP(s) based on information related to SL BWP configuration transmitted by the base station. For example, the second UE may configure SL BWP(s) based on information related to SL BWP configuration pre-defined in the system.

In step S1520, the first UE may transmit information related to specific resource(s) to the second UE. For example, the specific resource(s) may include resource(s) on the SL BWP overlapping in a time domain with a time period in which the first UE switched from the SL BWP to the Uu BWP communicates with the base station on the Uu BWP. For example, the communication may include UL transmission and/or DL reception. For example, the specific resource(s) may include resource(s) on the SL BWP overlapping in a time domain with a time period required for the first UE to perform switching from the SL BWP to the Uu BWP. For example, the specific resource(s) may include resource(s) on the SL BWP overlapping in a time domain with a time period required for the first UE to perform switching from the Uu BWP to the SL BWP.

For example, the information related to specific resource(s) may include information related to a time period in which the first UE switched from the SL BWP to the Uu BWP performs communication with the base station on the Uu BWP. For example, the information related to specific resource(s) may include information related to a time period required for the first UE to switch from the Uu BWP to the SL BWP. For example, the information related to specific resource(s) may include information related to a time period required for the first UE to switch from the SL BWP to the Uu BWP.

In step S1530, the second UE may select resource(s) for SL transmission on the SL BWP. For example, the second UE may select resource(s) for SL transmission on the SL BWP based on the information related to specific resource(s). For example, the second UE may select resource(s) for SL transmission on resource pool(s) in the SL BWP. In this case, the second UE may not select the specific resource(s) as resource(s) for SL transmission. For example, the specific resource(s) may be excluded from resource(s) for SL transmission.

Figure 16:
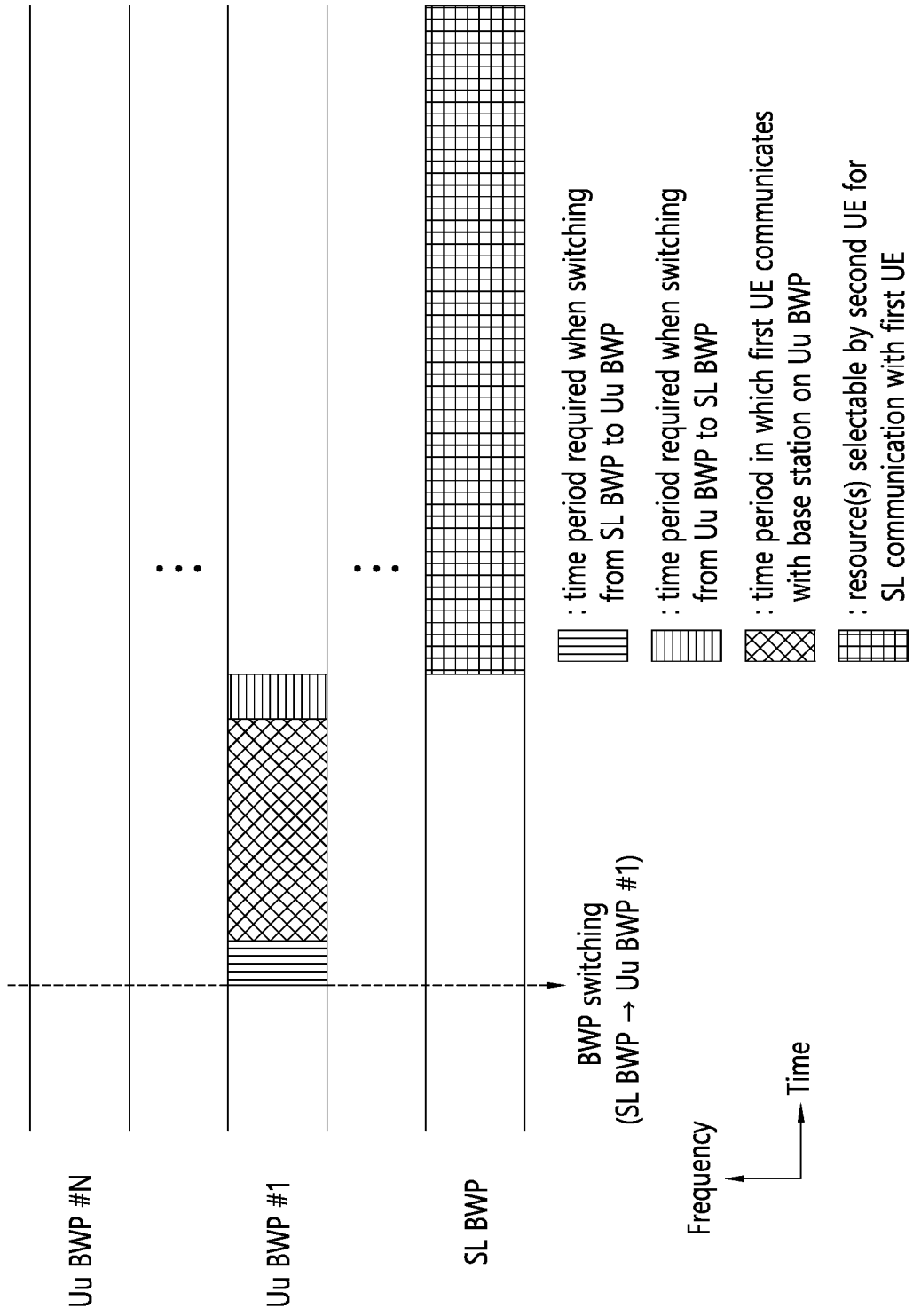
FIG. 16 shows a method for a second UE to select resource(s) for SL transmission on a SL BWP, in accordance with an embodiment of the present disclosure.

FIG. 16 shows a method for a second UE to select resource(s) for SL transmission on a SL BWP, in accordance with an embodiment of the present disclosure. The embodiment of FIG. 16 may be combined with various embodiments of the present disclosure.

Referring to FIG. 16, the first UE may perform BWP switching from a SL BWP to the Uu BWP #1. In this case, for example, a resource domain in which the second UE is able to select within the SL BWP may not include a resource domain overlapping with a time period required when the first UE switches from the SL BWP to the Uu BWP. For example, a resource domain in which the second UE is able to select within the SL BWP may not include a resource domain overlapping with a time period required when the first UE switches from the Uu BWP to the SL BWP. For example, a resource domain in which the second UE is able to select within the SL BWP may not include a resource domain overlapping with a time period in which the first UE communicates with the base station on the Uu BWP.

Referring back to FIG. 15, in step S1540, the second UE may perform SL transmission by using the selected resource(s). For example, the second UE may perform SL transmission to the first UE by using the selected resource(s).

According to various embodiments of the present disclosure, even if switching latency occurs due to BWP switching of the UE, the UE can efficiently perform SL transmission and reception.

Figure 17:
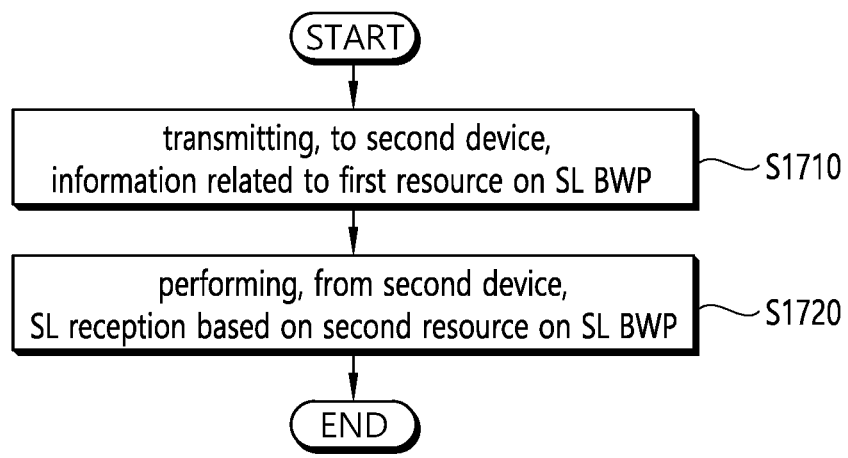
FIG. 17 shows a method of performing wireless communication by a first device, in accordance with an embodiment of the present disclosure.

FIG. 17 shows a method of performing wireless communication by a first device, in accordance with an embodiment of the present disclosure. The embodiment of FIG. 17 may be combined with various embodiments of the present disclosure.

Referring to FIG. 17, in step S1710, the first device may transmit, to a second device, information related to a first resource on a sidelink (SL) bandwidth part (BWP).

In step S1720, the first device may perform, from the second device, SL reception based on a second resource on the SL BWP. Herein, the second resource may not overlap with the first resource.

Additionally, the first device may perform a first BWP switching from the SL BWP to a Uu BWP. For example, the SL BWP may be a BWP related to SL communication configured for the first device, and the Uu BWP may be at least one of a BWP related to uplink (UL) communication configured for the first device or a BWP related to downlink (DL) communication configured for the first device. For example, the first resource may include a resource overlapping in a time domain with a time period in which the first device communicates with a base station on the Uu BWP. For example, the first resource may include a resource overlapping in a time domain with a time period required for the first BWP switching. Additionally, the first device may perform a second BWP switching from the Uu BWP to the SL BWP. For example, the first resource may include a resource overlapping in a time domain with a time period required for the second BWP switching.

For example, the second resource may be selected by the second device based on the information related to the first resource.

Additionally, the first device may select a third resource on the SL BWP. Additionally, the first device may perform, to the second device, SL transmission based on the third resource on the SL BWP. Herein, the third resource may not overlap with the first resource. For example, the first resource may include a resource overlapping in a time domain with a time period in which the first device communicates with a base station on a Uu BWP and a resource overlapping in a time domain with a time period required for BWP switching between the Uu BWP and the SL BWP.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. The one or more processors may execute the instructions to: transmit, to a second device, information related to a first resource on a sidelink (SL) bandwidth part (BWP); and perform, from the second device, SL reception based on a second resource on the SL BWP. Herein, the second resource may not overlap with the first resource.

According to an embodiment of the present disclosure, an apparatus configured to control a first user equipment (UE) may be provided. For example, the apparatus may comprise: one or more processors; and one or more memories operably connected to the one or more processors and storing instructions. The one or more processors may execute the instructions to: transmit, to a second UE, information related to a first resource on a sidelink (SL) bandwidth part (BWP); and perform, from the second UE, SL reception based on a second resource on the SL BWP. Herein, the second resource may not overlap with the first resource.

According to an embodiment of the present disclosure, a non-transitory computer-readable storage medium storing instructions may be provided. For example, the a non-transitory computer-readable storage medium storing instructions may, when executed, cause a first device to: transmit, to a second device, information related to a first resource on a sidelink (SL) bandwidth part (BWP); and perform, from the second device, SL reception based on a second resource on the SL BWP. Herein, the second resource may not overlap with the first resource.

Figure 18:
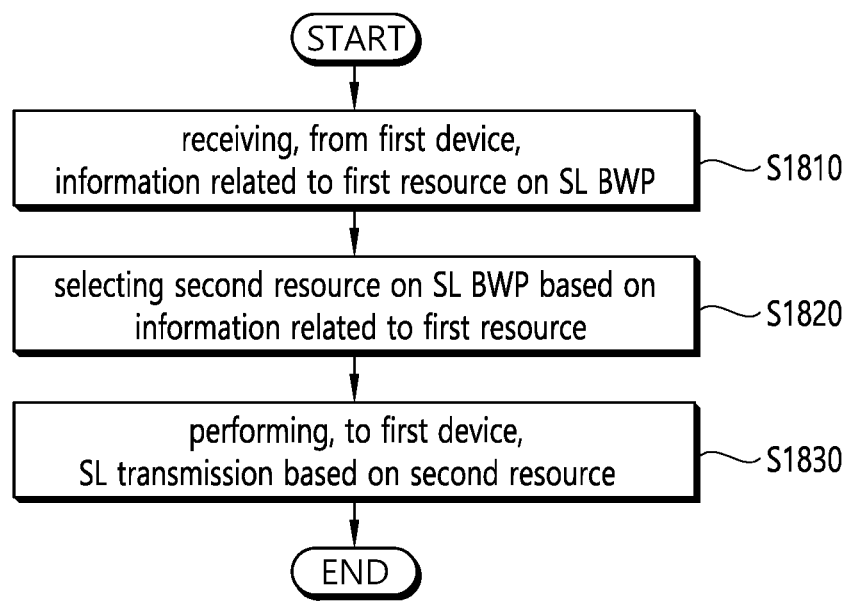
FIG. 18 shows a method of performing wireless communication by a second device, in accordance with an embodiment of the present disclosure.

FIG. 18 shows a method of performing wireless communication by a second device, in accordance with an embodiment of the present disclosure. The embodiment of FIG. 18 may be combined with various embodiments of the present disclosure.

Referring to FIG. 18, in step S1810, the second device may receive, from a first device, information related to a first resource on a sidelink (SL) bandwidth part (BWP). In step S1820, the second device may select a second resource on the SL BWP based on the information related to the first resource. In step S1830, the second device may perform, to the first device, SL transmission based on the second resource. Herein, the second resource may not overlap with the first resource. For example, the first resource may include a resource overlapping in a time domain with a time period in which the first device communicates with a base station on a Uu BWP and a resource overlapping in a time domain with a time period required for BWP switching between the Uu BWP and the SL BWP.

According to an embodiment of the present disclosure, a second device configured to perform wireless communication may be provided. For example, the second device may comprise: one or more memories storing instructions; one or more transceivers; and one or more processors connected to the one or more memories and the one or more transceivers. The one or more processors may execute the instructions to: receive, from a first device, information related to a first resource on a sidelink (SL) bandwidth part (BWP); select a second resource on the SL BWP based on the information related to the first resource; and perform, to the first device, SL transmission based on the second resource. Herein, the second resource may not overlap with the first resource.

The various embodiments of the present disclosure may be independently implemented. Alternatively, the various embodiments of the present disclosure may be implemented by being inter-combined or integrated. For example, although the various embodiments of the present disclosure are described based on a 3GPP system for simplicity in the description, the various embodiments of the present disclosure may also be extendedly applied to other system apart from the 3GPP system. For example, the various embodiments of the present disclosure will not be restricted only to direct communication between UEs and may also be used in uplink or downlink. At this point, a base station or relay node, and so on, may use the proposed methods according to the various embodiments of the present disclosure. For example, information on whether the method according to various embodiments of the present disclosure is applied may be defined to be transmitted, from a base station to a UE or from a transmitting UE to a receiving UE, through pre-defined signals (e.g., physical layer signals or higher layer signals). For example, information on rules according to various embodiments of the present disclosure may be defined to be transmitted, from a base station to a UE or from a transmitting UE to a receiving UE, through pre-defined signals (e.g., physical layer signals or higher layer signals). For example, among the various embodiments of the present disclosure, some of the embodiments may be limitedly applied only to resource allocation mode 1. For example, among the various embodiments of the present disclosure, some of the embodiments may be limitedly applied only to resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
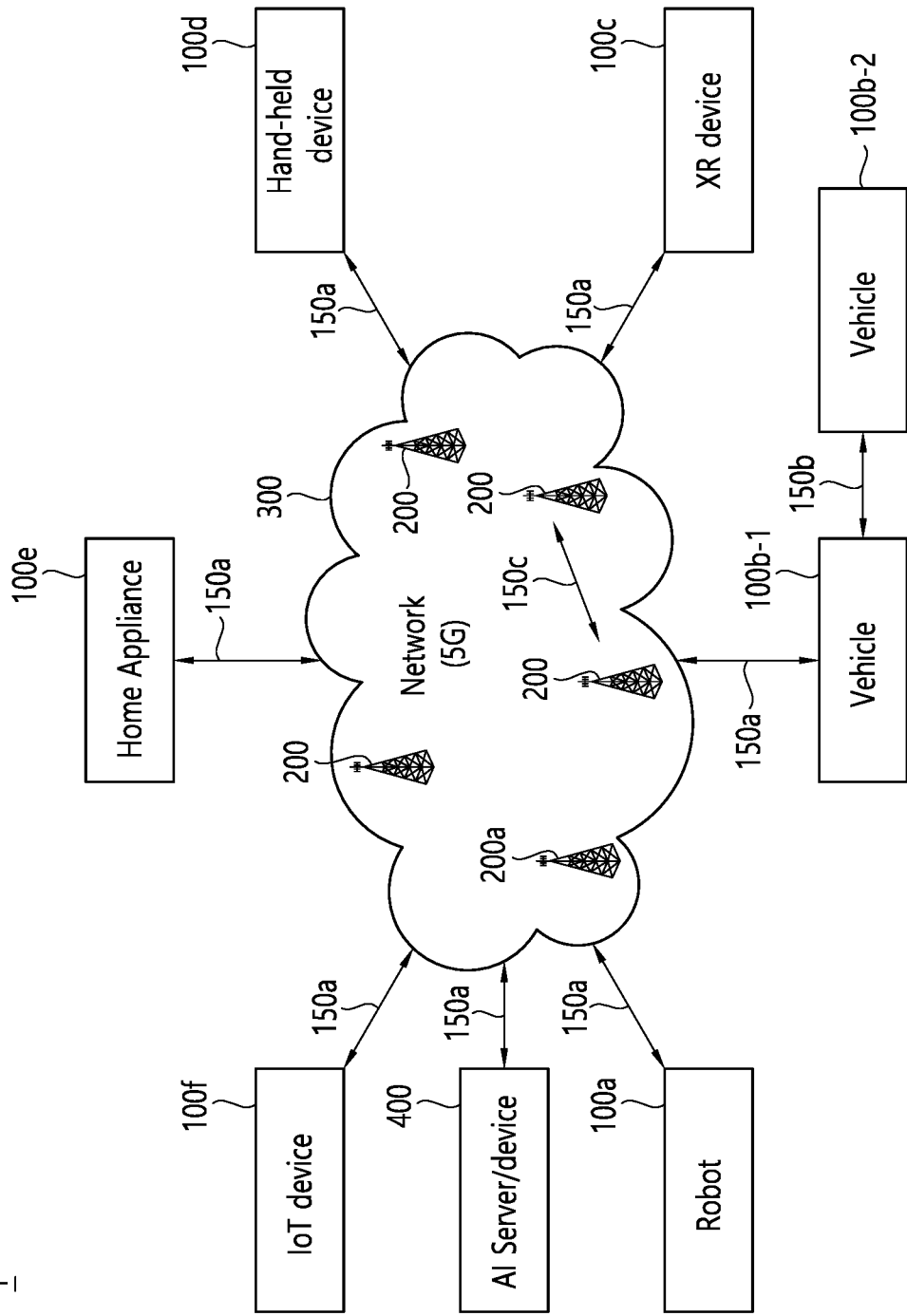
FIG. 19 shows a communication system 1, in accordance with an embodiment of the present disclosure.

FIG. 19 shows a communication system 1, in accordance with an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
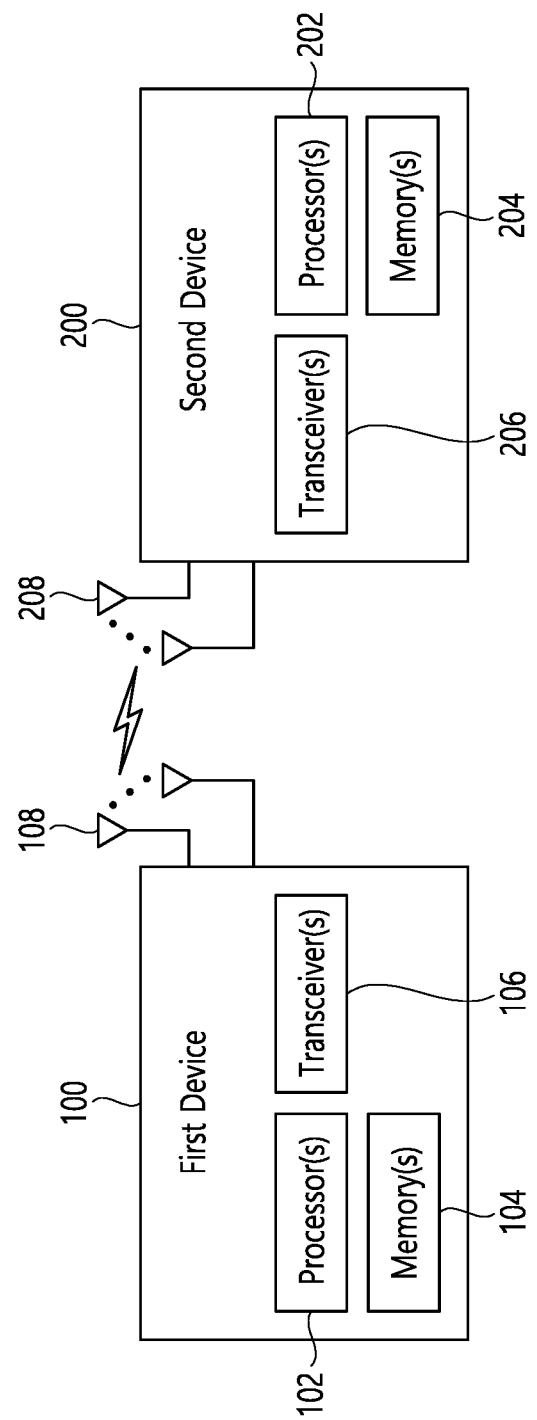
FIG. 20 shows wireless devices, in accordance with an embodiment of the present disclosure.

FIG. 20 shows wireless devices, in accordance with an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
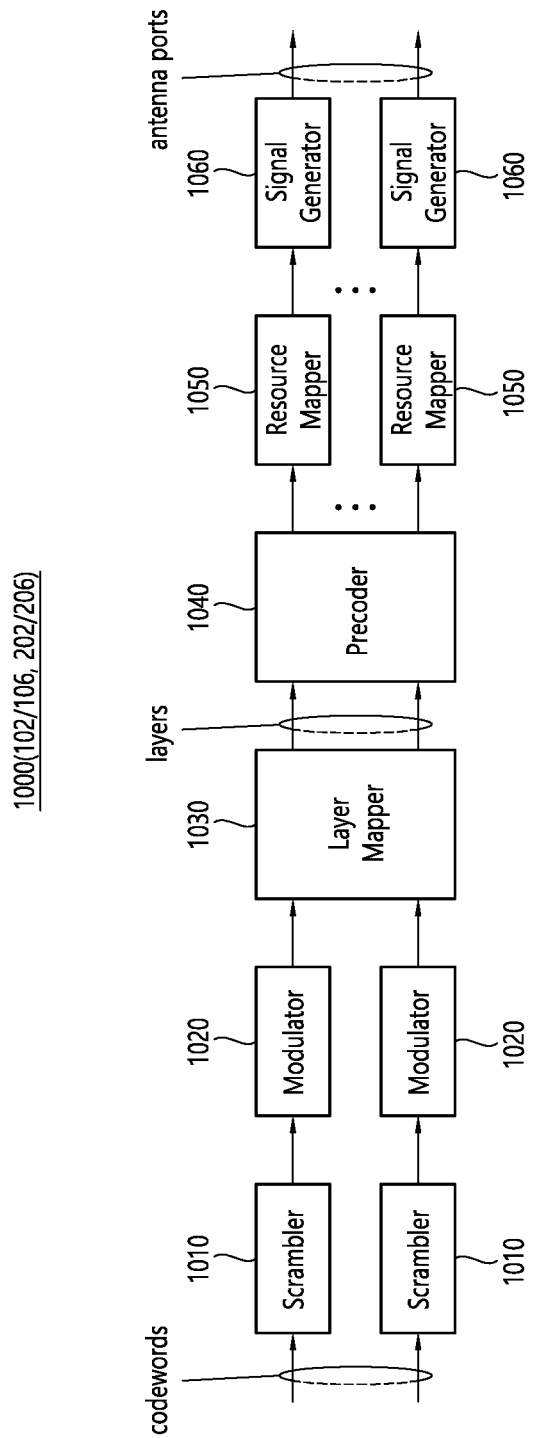
FIG. 21 shows a signal process circuit for a transmission signal, in accordance with an embodiment of the present disclosure.

FIG. 21 shows a signal process circuit for a transmission signal, in accordance with an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers.

To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
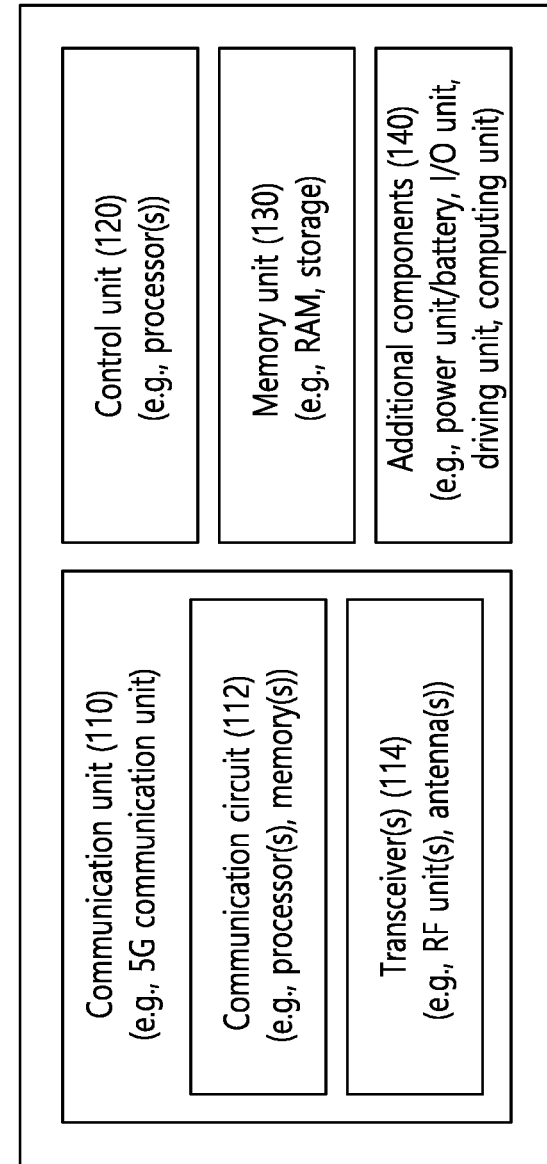
FIG. 22 shows another example of a wireless device, in accordance with an embodiment of the present disclosure.

FIG. 22 shows another example of a wireless device, in accordance with an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
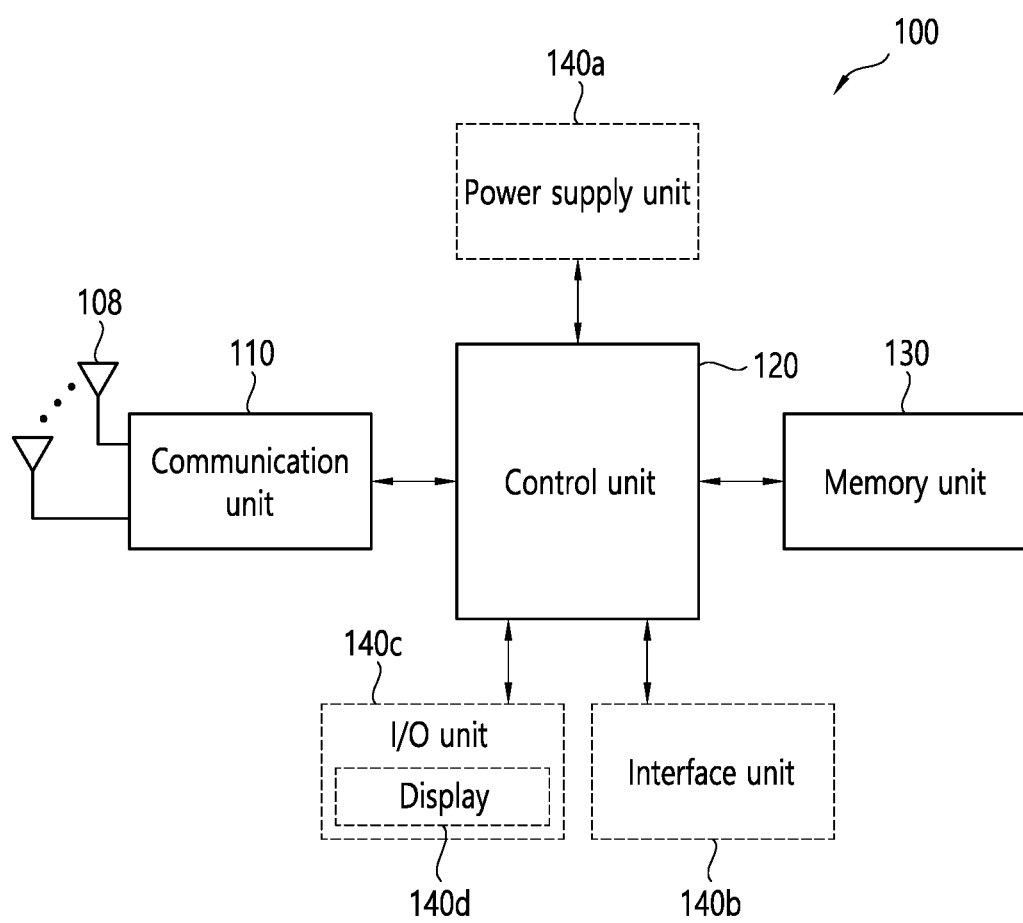
FIG. 23 shows a hand-held device, in accordance with an embodiment of the present disclosure.

FIG. 23 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
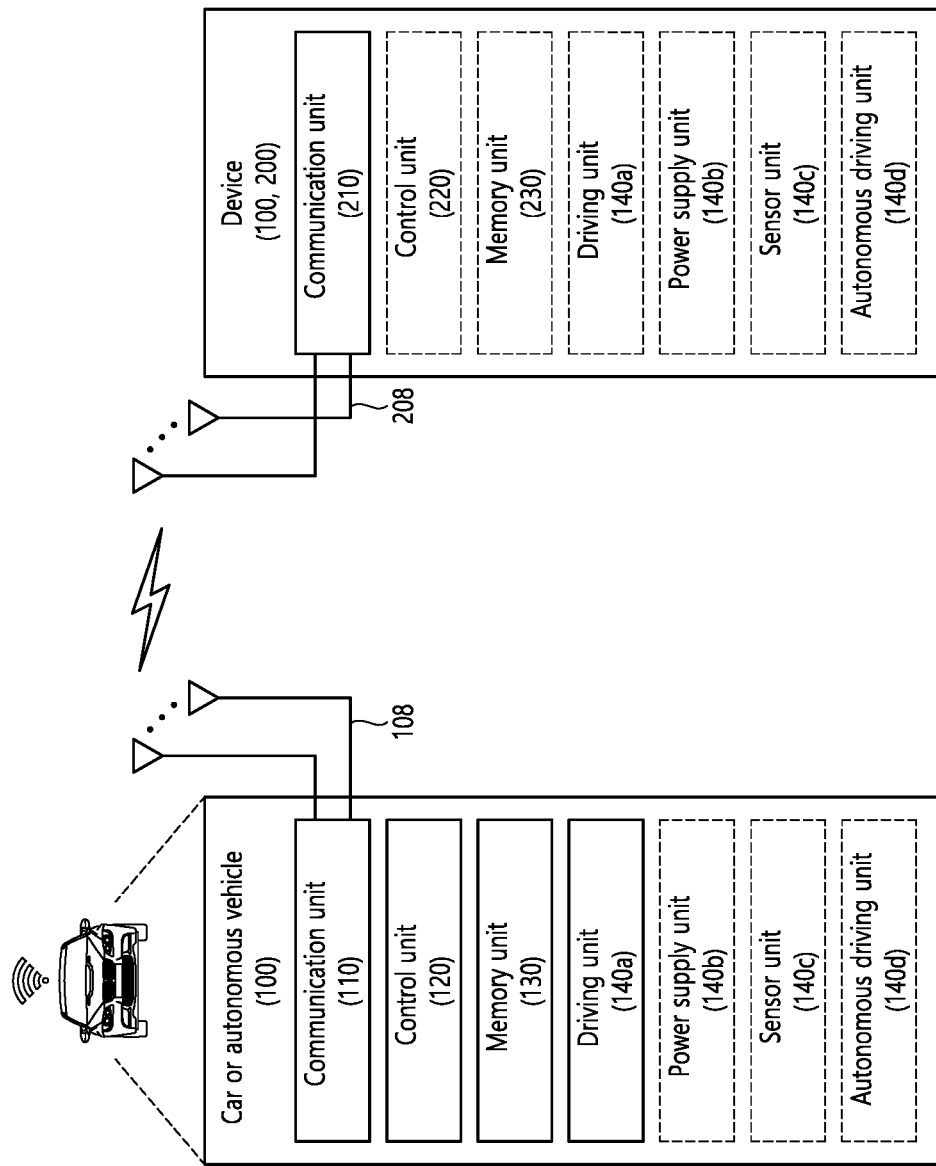
FIG. 24 shows a vehicle or an autonomous vehicle, in accordance with an embodiment of the present disclosure.

FIG. 24 shows a vehicle or an autonomous vehicle, in accordance with an embodiment of the present disclosure.

The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first device in a wireless communication system, the method comprising:
   obtaining configuration information related to a universal mobile telecommunications system (UMTS) user (Uu) bandwidth part (BWP);
   obtaining configuration information related to a sidelink (SL) BWP;
   transmitting, to a second device, information related to a first resource on the SL BWP;
   performing, from the second device, a SL reception based on a second resource on the SL BWP; and
   performing a first BWP switching from the SL BWP to the Uu BWP;
   wherein the second resource does not overlap with the first resource, and
   wherein the first resource includes a third resource overlapping in a time domain with a time period in which the first device communicates with a base station on the Uu BWP.

2. The method of claim 1,
   wherein the SL BWP is a BWP related to SL communication configured for the first device, and
   wherein the Uu BWP is at least one of a BWP related to uplink (UL) communication configured for the first device or a BWP related to downlink (DL) communication configured for the first device.

3. The method of claim 1,
   wherein the first resource includes a fourth resource overlapping in the time domain with a time period required for the first BWP switching.

4. The method of claim 1, further comprising:
   performing a second BWP switching from the Uu BWP to the SL BWP.

5. The method of claim 4,
   wherein the first resource includes a fifth resource overlapping in the time domain with a time period required for the second BWP switching.

6. The method of claim 1, wherein the second resource is selected by the second device based on the information related to the first resource.

7. The method of claim 1, further comprising:
   selecting a sixth resource on the SL BWP; and
   performing, to the second device, a SL transmission based on the sixth resource on the SL BWP,
   wherein the sixth resource does not overlap with the first resource.

8. The method of claim 7,
   wherein the first resource includes a fourth resource overlapping in the time domain with a time period required for the first BWP switching.

9. A first device adapted to perform wireless communication, the first device comprising:
   at least one transceiver;
   at least one processor; and
   at least one memory connected to the at least one processor and storing instructions that, based on being executed, cause the first device to perform operations comprising:

obtaining configuration information related to a universal mobile telecommunications system (UMTS) user (Uu) bandwidth part (BWP);

obtaining configuration information related to a sidelink (SL) BWP;

transmitting, to a second device, information related to a first resource on the SL BWP;

performing, from the second device, a SL reception based on a second resource on the SL BWP; and performing a BWP switching from the SL BWP to the Uu BWP;

wherein the second resource does not overlap with the first resource, and wherein the first resource includes a third resource overlapping in a time domain with a time period in which the first device communicates with a base station on the Uu BWP.

10. The first device of claim 9, wherein the first resource includes a fourth resource overlapping in the time domain with a time period required for the BWP switching.

11. The first device of claim 9, wherein the SL BWP is a BWP related to SL communication configured for the first device, and wherein the Uu BWP is at least one of a BWP related to uplink (UL) communication configured for the first device or a BWP related to downlink (DL) communication configured for the first device.

12. A processing device adapted to control a first device, the processing device comprising:

at least one processor; and at least one memory connected to the at least one processor and storing instructions that, based on being executed, cause the first device to perform operations comprising:

obtaining configuration information related to a universal mobile telecommunications system (UMTS) user (Uu) bandwidth part (BWP);

obtaining configuration information related to a sidelink (SL) BWP;

transmitting, to a second device, information related to a first resource on the SL BWP;

performing, from the second device, a SL reception based on a second resource on the SL BWP; and performing a BWP switching from the SL BWP to the Uu BWP;

wherein the second resource does not overlap with the first resource, and wherein the first resource includes a third resource overlapping in a time domain with a time period in which the first device communicates with a base station on the Uu BWP.

13. The processing device of claim 12, wherein the first resource includes a fourth resource overlapping in the time domain with a time period required for the BWP switching.

* * * * *